United States Patent
Jang et al.

(10) Patent No.: US 12,527,749 B2
(45) Date of Patent: Jan. 20, 2026

(54) PERCUTANEOUS ABSORPTION PREPARATION COMPRISING DONEPEZIL WITH IMPROVED STABILITY

(71) Applicants: DONG-A ST CO., LTD., Seoul (KR); KM TRANSDERM LTD., Osaka (JP)

(72) Inventors: Sun-Woo Jang, Seoul (KR); Chang-Yell Shin, Seoul (KR); Hae-Sun Kim, Hwaseong-si (KR); Kwang-Ho Cha, Seoul (KR); Hyun-Jung Kim, Yongin-si (KR); Sang-Min Hyun, Yongin-si (KR); Masaoki Goto, Osaka (JP)

(73) Assignees: DONG-A ST CO., LTD., Seoul (KR); KM TRANSDERM LTD., Osaka (JP)

( * ) Notice: Subject to any disclaimer, the term of this patent is extended or adjusted under 35 U.S.C. 154(b) by 511 days.

(21) Appl. No.: 17/924,781

(22) PCT Filed: May 12, 2021

(86) PCT No.: PCT/KR2021/005930
§ 371 (c)(1),
(2) Date: Nov. 11, 2022

(87) PCT Pub. No.: WO2021/230647
PCT Pub. Date: Nov. 18, 2021

(65) Prior Publication Data
US 2023/0201131 A1    Jun. 29, 2023

(30) Foreign Application Priority Data

May 13, 2020  (KR) ........................ 10-2020-0057402

(51) Int. Cl.
| | |
|---|---|
| A61K 9/70 | (2006.01) |
| A61K 31/445 | (2006.01) |
| A61K 47/02 | (2006.01) |
| A61K 47/10 | (2017.01) |
| A61K 47/12 | (2006.01) |
| A61K 47/14 | (2017.01) |
| A61K 47/16 | (2006.01) |
| A61K 47/20 | (2006.01) |
| A61K 47/22 | (2006.01) |
| A61P 25/28 | (2006.01) |

(52) U.S. Cl.
CPC .......... *A61K 9/7038* (2013.01); *A61K 9/7053* (2013.01); *A61K 31/445* (2013.01); *A61K 47/02* (2013.01); *A61K 47/10* (2013.01); *A61K 47/12* (2013.01); *A61K 47/14* (2013.01); *A61K 47/16* (2013.01); *A61K 47/20* (2013.01); *A61K 47/22* (2013.01); *A61P 25/28* (2018.01)

(58) Field of Classification Search
None
See application file for complete search history.

(56) References Cited

U.S. PATENT DOCUMENTS

| | | |
|---|---|---|
| 6,372,760 B1 | 4/2002 | Kato et al. |
| 8,507,527 B2 | 8/2013 | Ueki et al. |
| 2004/0202705 A1 | 10/2004 | Xiong et al. |
| 2008/0131490 A1* | 6/2008 | Hanatani ................. A61P 25/28 |
| | | 514/319 |
| 2008/0213368 A1 | 9/2008 | Ueki et al. |
| 2010/0062045 A1 | 3/2010 | Nishi et al. |
| 2019/0000774 A1* | 1/2019 | Hamada ................. A61K 47/14 |
| 2021/0059956 A1 | 3/2021 | Jang et al. |
| 2022/0047524 A1 | 2/2022 | Jang et al. |

FOREIGN PATENT DOCUMENTS

| | | |
|---|---|---|
| EP | 2 098 233 A1 | 9/2009 |
| EP | 2 098 234 A1 | 9/2009 |
| KR | 10-2009-0015173 A | 2/2009 |
| KR | 10-2009-0086565 A | 8/2009 |
| KR | 101454362 B1 | 10/2014 |
| KR | 101485822 B1 | 1/2015 |
| KR | 1020190057504 A | 5/2019 |
| KR | 102218593 B1 | 2/2021 |

(Continued)

OTHER PUBLICATIONS

International Search Report of PCT/KR2021/005930 dated Aug. 24, 2021 [PCT/ISA/210].

(Continued)

*Primary Examiner* — Sin J Lee
(74) *Attorney, Agent, or Firm* — Sughrue Mion, PLLC

(57) ABSTRACT

A percutaneous absorption preparation for the treatment of dementia wherein the drug-containing layer contains donepezil or a pharmaceutically acceptable salt thereof as an active ingredient and a stabilizer that is either (i) a mixture of a thiocyanate salt and a compound selected from the group consisting of tea catechin, (+)-catechin, epigallocatechin gallate, ascorbic acid, and isoascorbic acid, or (ii) a mixture of monothioglycerol and a compound selected from the group consisting of tea catechin, (+)-catechin, epigallocatechin gallate, and ascorbic acid is disclosed. The percutaneous absorption preparation meets the criteria of Procedure 1 and Procedure 2 of the U.S. Pharmacopoeia in short-term stress test (70° C. 48 hours storage), long-term accelerated test 1 (40° C. relative humidity 75% 1 month storage), and long-term accelerated test 2 (40° C. relative humidity 75% 3 months storage), and exhibits improved stability for long-term preservation.

15 Claims, No Drawings

(56) References Cited

FOREIGN PATENT DOCUMENTS

WO      2008/066180 A1      6/2008
WO      2019/132229 A1      7/2019

OTHER PUBLICATIONS

Written Opinion of PCT/KR2021/005930 dated Aug. 24, 2021 [PCT/ISA/237].
United States Patent and Trademark Office, Certificate of Correction for U.S. Pat. No. 8,507,527 issued Feb. 10, 2015.
Nanjo et al., "Radical Scavenging Activity of Tea Catechins and Their Related Compounds", Mosel. Biotechnol. Biochem., 63 (9), 1621-1623, 1999.
Botten et al., "Structural Properties of Green Tea Catechins", J. Phys. Chem. B 2015, 119, 12860-12867.
Green Tea Catechin Mix, G-016, Supelco, 2025 Merck KGaA, accessible at https://www.sigmaaldrich.com/US/en/product/cerillian/g016?srsltid=AfmBOorxMnDWq63KoqQpSxpomerxTMT_cB7dBsGQGkw-tiAFepll_BJb.
Hefei Light Industrial Products, Arts & Crafts Imp. & Exp. Co., Ltd., "Certificate of Analysis, Product Name: Tea Catechin", Jan. 23, 2019, 1 page.

\* cited by examiner

PERCUTANEOUS ABSORPTION PREPARATION COMPRISING DONEPEZIL WITH IMPROVED STABILITY

CROSS REFERENCE TO RELATED APPLICATIONS

This application is a National Stage of International Application No. PCT/KR2021/005930, filed May 12, 2021, claiming priority to Korean Patent Application No. 10-2020-0057402, filed May 13, 2020.

TECHNICAL FIELD

The present invention relates to percutaneous absorption preparation comprising donepezil with improved stability by inhibiting production of impurities in long-term storage conditions as well as short-term storage.

BACKGROUND ART

Donepezil, an acetylcholinesterase inhibitor, was developed for the purpose of treating Alzheimer's disease. It is commercially available as Aricept® oral tablets. The recommended initial dose is 5 mg for the first 4-6 weeks due to possible side effects. During this period, the dose may be increased up to 10 mg based on evaluation of clinical response. For patients who have been taking at 10 mg for at least 3 months, the dose may be increased up to 23 mg. However, oral tablets containing donepezil have been known to cause side effects such as nausea, vomiting, and diarrhea due to a rapid rise in blood concentration. They are also not easy to take for elderly patients with compromised swallowing ability. Also, it is difficult for dementia patients to take them regularly on their own. These factors contribute to low patient-compliance.

To overcome these disadvantages, various research and development efforts have been made in Korea and around the world on percutaneous absorption preparations containing donepezil or salt thereof. Percutaneous absorption preparations are usually formulated with high concentration of donepezil in order to produce systemic action. However, various environmental factors such as heat, light, and moisture cause donepezil to produce impurities, making it difficult to ensure stability during storage. Therefore, the needs for a stabilizer to solve the above-mentioned problem have been a topic of interest for a long time. There also have been consistent research efforts to provide solution to said problem.

The "Guideline on quality of transdermal patches" published by the European Medicines Agency recommends that limits for impurities in transdermal absorbents should comply with ICH Q3B, the guideline published by the International Council for Harmonization of Technical Requirements for Pharmaceuticals for Human Use. ICH Q3B presents a limit on general impurities according to the daily dose, and for impurities degraded from drug substance, the limit may be raised or lowered depending on the toxicity of the impurity.

The U.S. Pharmacopoeia has certain standard on impurities that may form degradation of donepezil in donepezil-containing tablets, and prohibits the use of donepezil tablets that exceed the maximum impurities limit due to possibility of toxicity from impurities.

Impurities generated from decomposition of a principal component substance are generally evaluated using liquid chromatography. The analytical conditions (e.g. columns, mobile phase conditions, absorption wavelength) determine the kinds of impurities that can be analyzed. The U.S. Pharmacopoeia presents two methods for analyzing donepezil for impurities.

The first method (hereinafter referred to as "Procedure 1") can be used to detect desbenzyl donepezil, donepezil open ring, and donepezil N-oxide. The U.S. Pharmacopoeia recommends that each of these impurities should be under 0.5%, and other unknown impurities under 0.2%. The second method ("Procedure 2") can be used to detect desbenzyl donepezil, donepezil pyridine analog, donepezil quaternary salt, donepezil indene analog, or deoxydonepezil. The U.S. Pharmacopoeia recommends that each of these impurities should be under 0.15%, other unknown impurities under 0.1%, and total impurities under 1.0%. It recommends Procedure 2 over Procedure 1 if there is a possibility of potential formation of the above-mentioned 5 impurities in a donepezil-containing preparation.

Research efforts to improve the stability of donepezil are disclosed in the U.S. Pat. No. 6,372,760, the Korea Patent Application No. 10-2009-0086565, the Korea Patent Registration No. 10-0866720, the Korea Patent Registration No. 10-1408500, Korea Patent Registration No. 10-1408454, and Korea Patent Application No. 2018-0167289.

The U.S. Pat. No. 6,372,760 tried to improve the stability of donepezil by adding an organic acid. The Korea Patent Registration No. 10-0866720 relates to a method for improving the stability of donepezil by adding a high molecular weight acidic substance and a high molecular weight basic substance for oral preparations and syrups. However, the above-mentioned prior art does not teach the application of a stabilizer for a percutaneous preparation.

Korea Patent Application No. 10-2009-0086565 discloses use of one or more stabilizers selected from the group consisting of ascorbic acid or a metal salt or ester thereof, isoascorbic acid or a metal salt thereof, ethylenediamine tetraacetic acid or a metal salt thereof, cysteine, acetylcysteine, 2-mercaptobenzimidazole, 3(2)-t-butyl-4-hydroxyanisole, 2,6-di-t-butyl-4-methylphenol, tetrakis [3',5'-di-t-butyl-4'-hydroxyphenyl)propionate]pentaerythritol, 3-mercapto-1,2-propanediol, tocopherol acetate, rutin, quercetin, hydroquinone, hydroxymethanesulfinic acid metal salt, metabisulfite metal salt, sulfite metal salt and thiosulfate metal salt to inhibit production of donepezil impurities in percutaneous absorption preparations. The above-mentioned prior art literature teaches that one or more stabilizers can inhibit production of donepezil N-oxide, desbenzyl donepezil and total impurities. However, the evaluation was done using only Procedure 1 of the methods suggested by the U.S. Pharmacopoeia in short-term stress conditions (70° C. 48 hours). Therefore, it is difficult to say that it effectively inhibited various impurities that may form from donepezil for a long-term period.

Also, Korea Patent Registration No. 10-1408500 and 10-1408454 disclose methods of inhibiting the formation of donepezil impurities in percutaneous absorption preparations using a combination of two stabilizers selected from the group consisting of isoascorbic acid, 2-mercaptobenzimidazole, hydroxymethanesulfonic acid metal salt, rutin, 2,6-di-t-butyl-4-methylphenol, ascorbic acid and metabisulfite metal salt thereof. The above-mentioned prior art teaches that a single stabilizer cannot effectively inhibit two types of impurities (donepezil N-oxide and desbenzyl donepezil) or total impurities. It also teaches that a combination of two stabilizers can inhibit donepezil N-oxide and desbenzyl donepezil as well as total impurities. However, the evaluation was done using only Procedure 1 of the methods suggested by the U.S. Pharmacopoeia under short-term stress conditions. Therefore, it is difficult to say that it effectively inhibited various impurities that may form from donepezil for a long-term period.

Korea Patent Application No. 2018-0167289 discloses that the use of thiocyanate salt (preferably potassium salt), monothioglycerol, or dimethylthiouria as a single stabilizer inhibits the production of donepezil impurities in percutaneous absorption preparations. Unlike the other prior arts, it confirmed inhibition of impurities under short-term stress conditions by both Procedure 1 and Procedure 2 of the U.S. Pharmacopoeia. It also reveals that donepezil percutaneous absorption preparations disclosed in other prior arts (Korea Patent Registration No. 10-1408500 and 10-1408454) do not meet the requirement of Procedure 1 and/or Procedure 2 of the U.S. Pharmacopoeia.

In their research and development efforts to commercialize the donepezil-containing percutaneous absorption preparation of the Korean Patent Application No. 2018-0167289, the inventors of the present invention have found that said preparations failed to meet the impurities acceptance criteria of Procedure 1 and Procedure 2 presented in the United States Pharmacopoeia upon long-term storage, indicating very low long-term stability. (Dimethylthiourea, one of the stabilizers disclosed in Korean Patent Application No. 2018-0167289 has been excluded from candidates for the present invention since it has not been approved for pharmaceutical use.)

Therefore, the present inventors studied donepezil-containing percutaneous absorption preparations that can maintain stability under short-term storage as well as long-term storage, using thiocyanate salt and monothioglycerol, which are the stabilizers disclosed in Korean Patent Application No. 2018-0167289. As a result, they have found adequate stabilizers that meet the criteria of Procedure 1 and Procedure 2 presented by the U.S. Pharmacopoeia by effectively inhibiting various impurities produced by decomposition of donepezil both in short-term and long-term storage conditions, arriving at the present invention.

DISCLOSURE OF INVENTION

Technical Problem

The object of the present invention is to provide a percutaneous absorption preparation comprising donepezil that can maintain stability during short-term and long-term storage thiocyanate salt and monothioglycerol, which are stabilizers disclosed in Korean Patent Application No. 2018-0167289.

Another object of the present invention is to provide a percutaneous absorption preparation comprising donepezil that meet the criteria of Procedure 1 and Procedure 2 presented by the U.S. Pharmacopoeia under short-term stress condition and long-term accelerated condition.

Solution to Problem

To accomplish the above-mentioned objective, the present invention provides a donepezil-containing percutaneous absorption preparation for the treatment of dementia comprising a support layer, a drug-containing layer, and a release liner, wherein the drug-containing layer comprises donepezil or a pharmaceutically acceptable salt thereof as an active ingredient; a pressure-sensitive adhesive; and a stabilizer combination which is either (i) a mixture of a thiocyanate salt and a stabilizer selected from the group consisting of tea catechin, (+)-catechin, epigallocatechin gallate, ascorbic acid, and isoascorbic acid, or (ii) a mixture of monothioglycerol and a stabilizer selected from the group consisting of tea catechin, (+)-catechin and epigallocatechin gallate.

The present invention is further described below.

Donepezil used in the drug-containing layer of the present invention is an acetylcholine-esterase inhibitor and may be used in its free base form or as a pharmaceutically acceptable salt thereof. Among the pharmaceutically acceptable salts of donepezil, acid addition salts formed by pharmaceutically acceptable free acid are useful. Preferable acid addition salts are derived from inorganic acids such as hydrochloric acid, nitric acid, phosphoric acid, sulfuric acid, hydrobromic acid, nitrous acid, and phosphorous acid, or from non-toxic organic acids such as aliphatic mono- and di-carboxylates, phenyl-substituted alkanoates, hydroxy-alkanoates, hydroxy-alkanedioates, aromatic acids, aliphatic and aromatic sulfonic acids. Such pharmaceutically non-toxic salts include sulfate, pyrosulfate, bisulfate, sulfite, bisulfite, nitrate, phosphate, monohydrogen phosphate, dihydrogenphosphate, metaphosphate, pyrophosphate chloride, bromide, iodide, fluoride, acetate, propionate, decanoate, caprylate, acrylate, formate, isobutyrate, caprate, heptanoate, propiolate, oxalate, malonate, succinate, suberate, sebacate, fumarate, maleate, butene-1,4-dioate, hexane-1,6-dioate, benzoate, chlorobenzoate, methyl benzoate, dinitrobenzoate, hydroxybenzoate, methoxybenzoate, phthalate, terephthalate, benzenesulfonate, toleuene-sulfonate, chlorobenzenesulfonate, xylene sulfonate, phenyl acetate, phenyl propionate, phenylbutyrate, citrate, lactate, β-hydroxybutyrate, glycolate, malate, tartrate, methane-sulfonate, propanesulfonate, naphthalene-1-sulfonate, naphthalene-2-sulfonate, and mandelate, but is not limited thereto.

In terms of dispersibility and percutaneous absorbability, donepezil in the form of a free base may be preferable in the drug-containing layer. Although no particular limit is imposed on the concentration of donepezil in the percutaneous absorption preparation of the present, for better dispersion of donepezil in the drug-containing layer and for better percutaneous absorption of donepezil from the drug-containing layer, preferred content range of donepezil is 1-20 wt % (of the weight of the drug-containing layer), preferably 1.5-15 wt %, and more preferably 2-10 wt %.

In the present invention, the stabilizer combination is (i) a mixture of thiocyanate salt and a stabilizer selected from the group consisting of and tea catechin, (+)-catechin, epigallocatechin gallate, ascorbic acid, and isoascorbic acid; or (ii) a mixture of monothioglycerol and a stabilizer selected from the group consisting of tea catechin, (+)-catechin and epigallocatechin gallate. In addition, a mixture of thiocyanate salt and a stabilizer selected from the group consisting of and tea catechin, (+)-catechin, epigallocatechin gallate, ascorbic acid, and isoascorbic acid may also additionally comprise monothioglycerol as stabilizer.

The thiocyanate salt used in the present invention is an antioxidant and a pharmaceutically acceptable salt, including but not limited to inorganic salts such as potassium, sodium, ammonium, calcium, magnesium, mercury, cobalt, lead, copper, silver, lithium, iron, nickel, cadmium, zinc, cesium, thallium, and barium, and organic salts such as ethyl, methyl, guanidine, benzyl, 1-ethyl-3-methylimidazolium, 1-butyl-3-methylimidazolium, tetramethylammonium, preferably, potassium thiocyanate can be used.

In the present invention, the stabilizer combination is contained in the drug-containing layer, and the weight percentage of the stabilizer combination is not particularly limited as long as it does not adversely affect the physical properties of the drug-containing layer. In determining a preferable example of the upper limit of the stabilizer ratio, based on the weight of the drug-containing layer (i.e., the total weight of the solid content of the combination used in forming the drug-containing layer), a few factors were considered. At above 5 wt %, the physical properties of the drug-containing layer such as adhesiveness may be compromised. At below 0.0005 wt %, sufficient stabilizing effect may not be achieved. Therefore, the preferable range of weight percentage of the stabilizer combination is from 0.0005 wt % to 5 wt %, more preferably from 0.005 wt % to 3 wt %, and still more preferably from 0.05 wt % to 2 wt %. For example, when three stabilizers are mixed, the amount of thiocyanate salt used is 0.01-50 wt % of total weight of donepezil, and the amount of the mixture of two or three stabilizers can be 1-500 wt % of the total weight of thiocyanate salt.

A pressure-sensitive adhesive in the present invention is not particularly limited. Examples include acrylic pressure-sensitive adhesive; rubber-based pressure-sensitive adhesives such as those using polyisoprene, styrene-butadiene, styrene-isoprene-styrene block copolymer, or styrene-butadiene-styrene block copolymer as base polymer; silicone adhesive; and vinyl-based polymeric adhesives such as those using polyvinyl alcohol, polyvinyl alkyl ether, and poly(vinyl acetate) as base polymer.

A more preferable example of pressure-sensitive adhesives in the present invention is a rubber-based pressure-sensitive adhesive using styrene-isoprene-styrene block copolymer as base polymer. Styrene-isoprene-styrene block copolymer is a thermoplastic elastomer comprising styrene and isoprene. Its properties such as melting point and solution viscosity vary widely depending on factors such as styrene content and diblock content.

Styrene-isoprene-styrene block copolymer used in the present invention is not particularly limited. Preferably, its solution viscosity is above 0.5 Pa*s, preferably 0.7 Pa*s, and more preferably 0.9 Pa*s, as measured according to "Method of measuring viscosity of styrene-isoprene-styrene block copolymer" described in the 2013 edition of the Japanese Pharmaceutical Excipients. The upper limit of the solution viscosity is not particularly limited, but preferably it is below 2.0 Pa*s, and more preferably 1.8 Pa*s.

If the drug-containing layer does not contain sufficient amount of base polymer of pressure-sensitive adhesive, the drug-containing layer may not be able to maintain its shape. If too much of the base polymer is used, the skin permeability of the drug is reduced. Therefore, the base polymer content of the drug-containing layer of the present invention is preferably from 10 wt % to 70 wt %, more preferably 15 wt %-65 wt %, even more preferably 20 wt %-60 wt %, and still more preferably 25 wt %-55 wt %.

The pressure-sensitive adhesive composition in the percutaneous absorption formulation may contain a plasticizer. Examples of plasticizers that can be used in the present invention include but are not limited to paraffinic process oils, naphthenic process oils, aromatic process oils, olive oil, camellia oil, tall oil, castor oil, isopropyl myristate, hexyl laurate, mineral oil, octyldodecyl myristate, propylene glycol, and propylene glycol monocaprylate. A combination of two or more of the aforementioned plasticizers may be used. The amount of the plasticizers to be incorporated is preferably from 10 wt % to 80 wt % in order to maintain sufficient cohesive strength of the pressure-sensitive adhesive composition. More preferably, it is 20 wt %-75 wt %, more preferably 25 wt %-70 wt %, and even more preferably 35 wt %-65 wt %.

A tackifying resin may be added to the drug-containing layer of the present invention in order to adjust the adhesiveness of the percutaneous absorption preparation. Tackifying resins that can be used in the present invention include but are not limited to rosin derivatives, alicyclic saturated hydrocarbon resin, and aliphatic hydrocarbon resin. Although terpene resin was used in the examples of the present invention, it is not intended to be construed as limiting the scope of the present invention.

If a tackifier is included in the drug-containing layer, the content of the tackifier is preferably at or below 20 wt % in order to reduce skin irritation. More preferably it is below 15 wt %, more preferably 10 wt %, and even more preferably 8 wt %. No tackifier at all is most preferred. That is, in terms of skin adhesiveness of the patch, the content of the tackifier may be adjusted depending on the blending ratio of donepezil, styrene-isoprene-styrene block copolymer, solubilizer, and plasticizer in the drug-containing layer. A tackifier may not be needed at all if sufficient skin adhesion is achieved without a tackifier.

In the present invention, the "support" in the "support layer" is not particularly limited, and one widely used for a percutaneous absorption preparation and the like can be used. For example, stretchable or nonstretchable woven fabric or nonwoven fabric of polyethylene, polypropylene, poly(ethylene terephthalate) and the like, films of polyesters such as poly(ethylene terephthalate) and the like, polyolefins such as polyethylene, polypropylene and the like, films such as polyurethane, ethylenevinyl acetate copolymer, polyvinyl chloride and the like, or a foamed support of polyolefin, polyurethane and the like can be used. These may be used alone, or a laminate of plural kinds thereof may be used.

Furthermore, to prevent accumulation of static electricity on the support layer, the aforementioned woven fabric, nonwoven fabric, film and the like constituting the support layer may contain an antistatic agent. Moreover, to achieve good anchor property to the adhesive layer, a nonwoven fabric or woven fabric, or a laminate thereof with a film can be used as a support layer. The thickness of a film as the support layer is generally 10-100 μm, preferably 15-50 μm, and the thickness of woven fabric, nonwoven fabric, and a porous sheets such as foamed support layer and the like is generally 50-2,000 μm, preferably 100-1,000 μm.

The percutaneous absorption preparation of the present invention can also be provided with a release liner generally used in this field. As the release liner, glassine, resin films of polyolefins such as polyethylene, polypropylene and the like, polyesters such as poly(ethylene terephthalate) and the like, polystyrene and the like, aluminum film, foamed polyethylene film or foamed polypropylene film and the like, or a laminate of two or more kinds of those mentioned above can be used, which may be subjected to silicone treatment or fluorine resin treatment, embossing, hydrophilic processing, hydrophobic processing and the like, and the like can also be used. The thickness of the release liner is generally 10 μm-200 μm, preferably 15 μm-150 μm.

In addition, the percutaneous absorption preparation of the present invention may contain excipient, solubilizer, penetration enhancer, flavor, colorant and the like as optional components.

No particular limit is imposed on the method of preparing the percutaneous absorption preparation. Conventional methods of preparing a percutaneous absorption preparation, such as that described in the Korean Pharmacopoeia—that is, dissolving or dispersing a pressure-sensitive adhesive agent, donepezil, a stabilizer, and a plasticizer in a solvent; applying the solution or dispersion onto the surface of the release liner; drying; and laminating support onto it. One embodiment example of the present invention is a method of producing a donepezil percutaneous absorption preparation comprising the following steps: (1) dissolving a mixture of donepezil and a stabilizer combination according to the present invention in an organic solvent; (2) applying the solution obtained in (1) onto the release liner an drying it to form a drug-containing layer; and (3) laminating the drug-containing layer obtained in (ii) with the support layer.

Examples of possible solvents that can be used in the above-mentioned method according to the present invention include ethyl acetate, toluene, hexane, 2-propanol, methanol, ethanol, methylene chloride, and tetrahydrofuran. The temperature at which the adhesive is dissolved or dispersed in the solvent is not particularly limited. However, higher temperatures may increase the likelihood of solvent evaporation and may increase decomposition of donepezil causing formation of more impurities. Therefore, the preferred temperature range is at or below 80° C., and more preferably at or below 60° C.

Furthermore, the method above of applying the solution or dispersion to the release liner, drying it, and laminating the support for the present invention may follow conventional methods of preparing percutaneous absorption preparation.

Advantageous Effects of Invention

The present invention provides a percutaneous absorption preparation comprising donepezil that meets Procedure 1 and Procedure 2 criteria of the United States Pharmacopoeia, with the change in impurities over time confirmed by short-term stress test (stored at 70° C. or 48 hours), long-term accelerated test 1 (stored at 40° C. relative humidity 75% for 1 month) and long-term accelerated test 2 (stored at 40° C. relative humidity 75% for 3 months).

The percutaneous absorption preparation comprising donepezil according to the present invention reduces formation of impurities by inhibiting decomposition of donepezil in short-term stress condition as well as long-term accelerated condition, meeting the impurities criteria of Procedure 1 and Procedure 2 of the U.S. Pharmacopoeia. Therefore, according to the present invention, percutaneous absorption preparation comprising donepezil with improved stability for long-term storage can be prepared.

BEST MODE FOR CARRYING OUT THE INVENTION

The present invention is further described below with examples and experimental examples. The examples and experimental examples provided below are provided to further describe the present invention in detail to a skilled person and shall not be construed as limiting the scope of the present invention.

<Examples 1 Through 13> Percutaneous Absorption Preparation According to the Present Invention Dissolve 16 g of styrene-isoprene-styrene block copolymer, 4.7 g of octyldodecyl myristate, 2 g of terpene resin, 6.5 g of propylene glycol monocaprylate, and 1.3 g of donepezil in 27 g of ethyl acetate to obtain an ethyl acetate solution comprising donepezil. Then, dissolve 0.13 g total (1/n each) of the stabilizers specified in Table 1 in 1 g of methanol and mix it with the ethyl acetate solution from the previous step.

Apply this mixture onto a silicone-coated PET film and dry it in an oven at 80° C. for 30 minutes. Afterwards, laminate it with a backing film. The obtained percutaneous absorption preparation are Examples 1 through 13 of the present invention.

TABLE 1

|  | Stabilizer 2 | Stabilizer 1 | Stabilizer 3 |
| --- | --- | --- | --- |
| Example 1 | Potassium thiocyanate | Tea catechin | — |
| Example 2 | Potassium thiocyanate | (+)-catechin | — |
| Example 3 | Potassium thiocyanate | Epigallocatechin gallate | — |
| Example 4 | Potassium thiocyanate | Ascorbic acid | — |
| Example 5 | Potassium thiocyanate | Isoascorbic acid | — |
| Example 6 | Potassium thiocyanate | Tea catechin | Monothioglycerol |
| Example 7 | Potassium thiocyanate | (+)-catechin | Monothioglycerol |
| Example 8 | Potassium thiocyanate | Epigallocatechin gallate | Monothioglycerol |
| Example 9 | Potassium thiocyanate | Ascorbic acid | Monothioglycerol |
| Example 10 | Potassium thiocyanate | Isoascorbic acid | Monothioglycerol |
| Example 11 | Monothioglycerol | Tea catechin | — |
| Example 12 | Monothioglycerol | (+)-catechin | — |
| Example 13 | Monothioglycerol | Epigallocatechin gallate | — |

<Comparative Example 1> Percutaneous Absorption Preparation without Stabilizer Comparative example 1 is a percutaneous absorption preparation that is identical to Example 1 in composition and method of preparation except that it does not contain a stabilizer.

<Comparative Examples 2 Through 4>
Percutaneous Absorption Preparation with Potassium Thiocyanate and/or Monothioglycerol Described in Korean Patent Application No. 2018-0167289 Added as Stabilizer Percutaneous absorption preparations were prepared according to the same composition and preparation method as Example 1, with the addition of potassium thiocyanate and/or monothioglycerol, which are stabilizers described in Korean Patent Application No. 2018-0167289. The resulting preparation was labeled as comparative Examples 2 through 4.

<Comparative Examples 5 Through 16>
Percutaneous Absorption Preparation with Citric Acid, Tartaric Acid, or Benzoic Acid Described in Korean Patent Application No. 2018-0167289 Added as Stabilizer to Comparative Examples 2 Through 4

Comparative Examples 5 through 7 are percutaneous absorption preparations comprising citric acid, tartaric acid, or benzoic acid, respectively, among the stabilizers described in U.S. Pat. No. 6,372,760. Comparative Examples 8 through 16 are percutaneous absorption preparations prepared by adding citric acid, tartaric acid, or benzoic acid (described in U.S. Pat. No. 6,372,760) to Comparative Examples 2 through 4, prepared according to the same method as Example 1.

TABLE 2

|  | Stabilizer 2 | Stabilizer 1 | Stabilizer 3 |
|---|---|---|---|
| Comparative Example 5 | — | Citric acid | — |
| Comparative Example 6 | — | Tartaric acid | — |
| Comparative Example 7 | — | Benzoic acid | — |
| Comparative Example 8 | Potassium thiocyanate | Citric acid | — |
| Comparative Example 9 | Potassium thiocyanate | Tartaric acid | — |
| Comparative Example 10 | Potassium thiocyanate | Benzoic acid | — |
| Comparative Example 11 | Monothioglycerol | Citric acid | — |
| Comparative Example 12 | Monothioglycerol | Tartaric acid | — |
| Comparative Example 13 | Monothioglycerol | Benzoic acid | — |
| Comparative Example 14 | Potassium thiocyanate | Monothioglycerol | Citric acid |
| Comparative Example 15 | Potassium thiocyanate | Monothioglycerol | Tartaric acid |
| Comparative Example 16 | Potassium thiocyanate | Monothioglycerol | Benzoic acid |

<Comparative Examples 17 Through 20>
Percutaneous Absorption Preparation with Two Stabilizers Described in Korean Patent Registration Publication No. 10-1408500

Percutaneous absorption preparations were prepared in the same composition and method as in Example 1, with the addition of one of the four pairs of stabilizers in Table 3 which were the most effectively at inhibiting donepezil N-oxide, desbenzyl donepezil, and total impurities out of the ones described in Korean Patent Registration Publication No. 10-1408500. They are labeled Comparative Examples 17 to 20.

TABLE 3

|  | Stabilizer 1 | Stabilizer 2 |
|---|---|---|
| Comparative Example 17 | Isoascorbic acid | 2-mercaptobenzimidazole |
| Comparative Example 18 | 2-mercaptobenzimidazole | 2,6-di-t-butyl-4-methylphenol |
| Comparative Example 19 | 2-mercaptobenzimidazole | Rutin |
| Comparative Example 20 | 2,6-di-t-butyl-4-methylphenol | Sodium hydroxymethane sulfonate |

<Comparative Example 21> Percutaneous Absorption Preparation with Two Stabilizers Added A percutaneous absorption preparation was prepared according to the same composition and preparation method as example 1, with the addition of ascorbic acid and sodium metabisulfite (0.13 g of each), which are stabilizers disclosed in Korea Patent Registration No. 10-1408454. The resulting preparation was labeled as comparative example 21.

<Comparative Examples 22 Through 49> Percutaneous Absorption Preparation with Various Stabilizers Described in Korean Patent Application No. 10-2009-0086565

Percutaneous absorption preparations were prepared according to the same composition and preparation method as example 1, with the addition of stabilizers described in Korean Patent Application No. 10-2009-0086565 and various known stabilizers as specified in Table 4 below. They are labeled Comparative Examples 22 through 49.

TABLE 4

|  | Stabilizer 1 | Stabilizer 2 |
| --- | --- | --- |
| Comparative Example 22 | Ethylenediaminetetraacetic acid (EDTA) | — |
| Comparative Example 23 | Cysteine | — |
| Comparative Example 24 | 2-mercaptobenzimidazole | — |
| Comparative Example 25 | Butylhydroxyanisole | — |
| Comparative Example 26 | 2,6-di-t-butyl-4-methylphenol | — |
| Comparative Example 27 | Pentaerythrityl tetra-di-t-butyl hydroxyhydrocinnamate | — |
| Comparative Example 28 | Quercetin dihydrate | — |
| Comparative Example 29 | Hydroquinone | — |
| Comparative Example 30 | Sodium hydroxymethane sulfonate | — |
| Comparative Example 31 | Sodium metabisulfite | — |
| Comparative Example 32 | Sodium sulfite | — |
| Comparative Example 33 | Sodium thiosulfate | — |
| Comparative Example 34 | Propyl gallate | — |
| Comparative Example 35 | 1,3-butanediol | — |
| Comparative Example 36 | (+)-Alpha-tocopherol | — |
| Comparative Example 37 | Alpha-tocopherol acetate | — |
| Comparative Example 38 | Benzotriazole | — |
| Comparative Example 39 | Rutin | — |
| Comparative Example 40 | ascorbic acid | — |
| Comparative Example 41 | isoascorbic acid | — |
| Comparative Example 42 | tea catechin | — |
| Comparative Example 43 | (+)-catechin | — |
| Comparative Example 44 | Epigallocatechin gallate | — |
| Comparative Example 45 | 2,6-di-t-butyl-4-methylphenol | tea catechin |
| Comparative Example 46 | butylated hydroxyanisole | tea catechin |
| Comparative Example 47 | sodium thiosulfate | tea catechin |
| Comparative Example 48 | 2,6-di-t-butyl-4-methylphenol | isoascorbic acid |
| Comparative Example 49 | butylated hydroxyanisole | isoascorbic acid |

<Comparative Examples 50 Through 67>
Percutaneous Absorption Preparations with Potassium Thiocyanate and Various Stabilizers Described in Korean Patent Application No. 10-2009-0086565

Percutaneous absorption preparations were prepared according to the same composition and preparation method as example 1, with the addition of potassium thiocyanate and one of the stabilizers described in Korean Patent Application No. 10-2009-0086565 as specified in Table 5 below. They are labeled Comparative Examples 50 through 67.

TABLE 5

|  | Stabilizer 2 | Stabilizer 1 |
|---|---|---|
| Comparative Example 50 | Potassium thiocyanate | Ethylenediaminetetraacetic acid (EDTA) |
| Comparative Example 51 |  | Cysteine |
| Comparative Example 52 |  | 2-mercaptobenzimidazole |
| Comparative Example 53 |  | butylated hydroxyanisole |
| Comparative Example 54 |  | dibutyl hydroxy toluene |
| Comparative Example 55 |  | Pentaerythryltetra-di-t-butyl hydroxyhydrocinnamate |
| Comparative Example 56 |  | Quercetin dihydrate |
| Comparative Example 57 |  | Hydroquinone |
| Comparative Example 58 |  | Sodium hydroxymethane sulfonate |
| Comparative Example 59 |  | Sodium bisulfite |
| Comparative Example 60 |  | Sodium sulfite |
| Comparative Example 61 |  | sodium thiosulfate |
| Comparative Example 62 |  | Propyl gallate |
| Comparative Example 63 |  | 1,3-butanediol |
| Comparative Example 64 |  | (+)-Alpha-tocopherol |
| Comparative Example 65 |  | Alpha-tocopherol acetate |
| Comparative Example 66 |  | Benzotriazole |
| Comparative Example 67 |  | Rutin |

<Comparative Examples 68 Through 86>
Percutaneous Absorption Preparation with Monothioglycerol and Various Stabilizers Described in Korean Patent Application No. 10-2009-0086565

Percutaneous absorption preparations were prepared according to the same composition and preparation method as example 1, with the addition of monothioglycerol (the same compound as 3-mercapto-1,2-propanediol described in Korean Patent Application No. 10-2009-0086565) and one of the stabilizers described in Korean Patent Publication No. 10-2009-0086565 as specified in Table 6 below. The resulting preparations are labeled Comparative Examples 68 to 86.

TABLE 6

|  | Stabilizer 2 | Stabilizer 1 |
|---|---|---|
| Comparative Example 68 | Monothioglycerol | Ethylenediaminetetraacetic acid (EDTA) |
| Comparative Example 69 |  | Cysteine |
| Comparative Example 70 |  | 2-mercaptobenzimidazole |
| Comparative Example 71 |  | butylated hydroxyanisole |
| Comparative Example 72 |  | dibutyl hydroxy toluene |
| Comparative Example 73 |  | Pentaerythryltetra-di-t-butyl hydroxyhydrocinnamate |
| Comparative Example 74 |  | Quercetin dihydrate |
| Comparative Example 75 |  | Hydroquinone |
| Comparative Example 76 |  | Sodium hydroxymethane sulfonate |
| Comparative Example 77 |  | Sodium bisulfite |
| Comparative Example 78 |  | Sodium sulfite |
| Comparative Example 79 |  | Sodium thiosulfate |
| Comparative Example 80 |  | Propyl gallate |
| Comparative Example 81 |  | 1,3-Butanediol |
| Comparative Example 82 |  | (+)-alpha-tocopherol |
| Comparative Example 83 |  | alpha-tocopherol acetate |
| Comparative Example 84 |  | Benzotriazole |
| Comparative Example 85 |  | Rutin |
| Comparative Example 86 |  | isoascorbic acid |

<Comparative Examples 87 Through 104>
Percutaneous Absorption Preparation with Potassium Thiocyanate and Monothioglycerol and Various Stabilizers Described in Korean Patent Application No. 10-2009-0086565

Percutaneous absorption preparations were prepared according to the same composition and preparation method as example 1, with the addition of potassium thiocyanate and monothioglycerol and one of the stabilizers described in Korean Patent Application No. 10-2009-0086565 as specified in Table 7 below. They are labeled Comparative Examples 87 through 104.

TABLE 7

| Example No. | Stabilizer 2 | Stabilizer 3 | Stabilizer 1 |
|---|---|---|---|
| Comparative Example 87 | Potassium thiocyanate | Monothioglycerol | Ethylenediaminetetraacetic acid (EDTA) |
| Comparative Example 88 | | | Cysteine |
| Comparative Example 89 | | | 2-mercaptobenzimidazole |
| Comparative Example 90 | | | Butylhydroxyanisole |
| Comparative Example 91 | | | Dibutylhydroxytoluene |
| Comparative Example 92 | | | Pentaerythrityl tetra-di-t-butyl hydroxyhydrocinnamate |
| Comparative Example 93 | | | Quercetin dihydrate |
| Comparative Example 94 | | | Hydroquinone |
| Comparative Example 95 | | | Sodium hydroxymethane sulfonate |
| Comparative Example 96 | | | Sodium metabisulfite |
| Comparative Example 97 | | | Sodium sulfite |
| Comparative Example 98 | | | Sodium thiosulfate |
| Comparative Example 99 | | | Propyl gallate |
| Comparative Example 100 | | | 1,3-butanediol |
| Comparative Example 101 | | | (+)-Alpha-tocopherol |
| Comparative Example 102 | | | Alpha-tocopherol acetate |
| Comparative Example 103 | | | Benzotriazole |
| Comparative Example 104 | | | Rutin |

<Experimental Example 1> Impurities Evaluation by Procedure 1 after Short-Term Stress Conditions 70° c. for 48 Hours To test for donepezil impurities under short-term storage, percutaneous absorption preparations of examples and comparative examples were tested for donepezil impurities according to Procedure 1 as below, after short-term stress condition of 48 hours of storage at 70° C.

1. Impurities Analysis by Procedure 1

Each percutaneous absorption preparation was dissolved in ethyl acetate for 60 minutes by stirring. Methanol was added and the resulting solution was stirred for 60 minutes and centrifuged for 5 minutes. The resulting supernatant was used as the sample solution for Procedure 1 of the U.S. Pharmacopoeia. The standard solution was prepared so that the concentration of donepezil hydrochloride standard was 0.8 ug/mL using a solvent mixture of ethyl acetate:methanol=15:85 (volume ratio).

<Procedure 1: Liquid Chromatography Conditions>

Column: Inertsil ODS-2 (4.6×150 mm, C18, 5 um)

Mobile phase: Dissolve 2.5 g of Sodium 1-decanesulfonate 2.5 g in 650 mL of purified water. Then, add 1 mL of 70% perchloric acid solution and 350 mL of acetonitrile.

Column temperature: 35° C.

Flow rate: 1.4 mL/min

Injection size: 20 uL

UV wavelength: 271 nm

Calculation:

Impurity %=(Ru/Rs)×(Cs/Cu)×(1/F)×100

Ru: peak response of any individual impurity from the sample solution

Rs: peak response of donepezil from the standard solution

Cs: concentration in the standard solution (mg/mL)

Cu: concentration in the sample solution (mg/mL)

F: relative correction factor for each impurity

| Impurity | Relative retention time (RRT) | Relative correction factor (F) | Acceptance criteria (%) |
|---|---|---|---|
| Desbenzyl donepezil | 0.33 | 1 | 0.5 |
| Donepezil open ring | 0.7 | 0.6 | 0.5 |
| Donepezil N-oxide | 1.2 | 1 | 0.5 |
| Any individual unspecified degradation product | — | — | 0.2 |

2. Impurities Evaluation

The percutaneous absorption preparations of the examples according to the present invention and comparative examples were subject to short-term stress condition of storage for 48 hours at 70° C. and then tested for donepezil impurities according to Procedure 1. The results are shown in Table 8.

As seen in Table 8 below, in Comparative Example 1 without stabilizer, a large amount of impurities were produced from decomposition of donepezil by Procedure 1 at the relative retention times (RRT) 0.53 (unidentified impurity), 1.2 (donepezil N-oxide), as well as for total impurities, demonstrating the need for stabilizers in percutaneous absorption preparations of donepezil.

As for the percutaneous absorption preparations comprising the stabilizers potassium thiocyanate (Comparative Example 2) or monothioglycerol (Comparative Example 3) described in Korean Patent Application No. 2018-0167289 or a mixture of the two (potassium thiocyanate and monothioglycerol), the amount of impurities produced under short-term stress condition met the criteria of Procedure 1 proposed by the U.S. Pharmacopeia, confirming outstanding stability.

As for Comparative Examples 5 through 7 using citric acid, tartaric acid, and benzoic acid, which are the organic acids described in U.S. Pat. No. 6,372,760, the relative retention time of 1.2 (Donepezil N-oxide) was inadequate to the standards set forth in the United States Pharmacopeia. As for Comparative Examples 8 through 16 which are Comparative Examples 2 through 4 with the above stabilizers added, the relative retention time of 1.2 (Donepezil N-oxide) was significantly reduced, meeting the criteria of Procedure 1 presented in the U.S. Pharmacopeia under short-term stress condition.

In the case of Comparative Examples 17 through 21 using a combination of two stabilizers described in Korean Registered Patent Publication No. 10-1408500 or Korean Registered Patent Publication No. 10-1408454, the impurities met the criteria of Procedure 1 presented in the U.S. Pharmacopeia under short-term stress conditions.

As for Comparative Examples 22 through 44, which are percutaneous absorption preparations with stabilizers described in Korean Patent Publication No. 10-2009-0086565 added, Comparative Example 23 (cysteine), Comparative Example 24 (2-mercaptobenzimidazole), Comparative Example 30 (sodium hydroxymethanesulfonate) and Comparative Example 33 (sodium thiosulfate) met the criteria of Procedure 1 set forth in the U.S. Pharmacopeia under short-term stress conditions in terms of individual impurity, but most of the stabilizers were did not produce adequate result when added alone.

Also, as for Comparative Examples 45 through 49 which have a combination of a stabilizer described in Korean Patent Application Publication No. 10-2009-0086565 and a conventionally known stabilizer, Comparative Example 45 (2,6-di-t-butyl-4-methylphenol/chacatechin), Comparative Example 48 (2,6-di-t-butyl-4-methylphenol/isoascorbic acid) and Comparative Example 49 (butylhydroxyanisole/isoascorbic acid) met the criteria of Procedure 1 described in the United States Pharmacopoeia. On the other hand, Comparative Example 46 (butyl hydroxyanisole/chacatechin) and Comparative Example 47 (sodium thiosulfate/chacatechin) did not meet the criteria of Procedure 1 presented in the United States Pharmacopeia.

As for Comparative Examples 50 through 67, which are percutaneous absorption preparations which have a combination of potassium thiocyanate, a stabilizer described in Korean Patent Application No. 2018-0167289, and one stabilizer described in Korean Patent Application Publication No. 10-2009-0086565, most of the stabilizers met the criteria of Procedure 1 suggested by the United States Pharmacopeia, but Comparative Example 53 (potassium thiocyanate/butylhydroxyanisole), Comparative Example 57 (potassium thiocyanate/hydroquinone), Comparative Example 62 (potassium thiocyanate/propyl gallate) and Comparative Example 64 (potassium thiocyanate/(+)-alpha-tocopherol) were not adequate in terms of individual impurities by Procedure 1 suggested by the United States Pharmacopeia under of short-term stress condition.

As for Comparative Examples 68 through 86, which are percutaneous absorption preparations with monothioglycerol which is stabilizer described in Korean Patent Application No. 2018-0167289 and one of the stabilizers described in Korean Patent Application Publication No. 10-2009-0086565, most of the stabilizers met the criteria of Procedure 1 presented in U.S. Pharmacopoeia, but Comparative Example 71 (monothioglycerol/butylhydroxyanisole) and Comparative Example 82 (monothioglycerol/(+)-alpha-tocopherol/) were not adequate interns of individual impurities by Procedure 1 proposed by the United States Pharmacopeia under short-term stress conditions.

Also, as for Comparative Examples 87 through 104, which are percutaneous absorption preparations which have monothioglycerol and potassium thiocyanate described in Korean Patent Application No. 2018-0167289 and one stabilizer described in Korean Patent Application Publication No. 10-2009-0086565, most of the stabilizers met the criteria of Procedure 1 suggested by the United States Pharmacopeia, but Comparative Example 90 (potassium thiocyanate/monothioglycerol/butylhydroxyanisole), Comparative Example 94 (potassium thiocyanate/monothioglycerol/hydroquinone), Comparative Example 99 (potassium thiocyanate/monothioglycerol/propyl gallate) and Comparative Example 101 (potassium thiocyanate/monothioglycerol/(+)-alpha-tocopherol) were not adequate in terms of individual impurities by Procedure 1 suggested by the United States Pharmacopeia under of short-term stress condition.

On the other hand, Examples 1 through 13 according to the present invention met the criteria of Procedure 1 suggested by the United States Pharmacopeia under short-term stress conditions in terms of individual impurities, demonstrating outstanding stabilizing effect.

TABLE 8

Short-term stress condition of 70° C., 48 hr, Procedure 1 of impurities analysis

| | Stabilizer 1 | Stabilizer 2 | Stabilizer 3 | Content (%) of each impurity according to RRT | | | | | |
| --- | --- | --- | --- | --- | --- | --- | --- | --- | --- |
| | | | | RRT 0.33[1] | RRT 0.48[2] | RRT 0.53[3] | RRT 0.74[4] | RRT 1.25[5] | Total |
| Example 1 | Potassium thiocyanate | Tea catechin | — | 0.01 | 0.00 | 0.04 | 0.00 | 0.05 | 0.17 |
| Example 2 | | (+)-catechin | — | 0.00 | 0.00 | 0.04 | 0.00 | 0.06 | 0.15 |
| Example 3 | | Epigallocatechin gallate | — | 0.03 | 0.00 | 0.04 | 0.00 | 0.09 | 0.26 |
| Example 4 | | Ascorbic acid | — | 0.00 | 0.00 | 0.00 | 0.00 | 0.08 | 0.14 |
| Example 5 | | Isoascorbic acid | — | 0.00 | 0.00 | 0.00 | 0.00 | 0.09 | 0.15 |
| Example 6 | Potassium thiocyanate | Tea catechin | Monothioglycerol | 0.00 | 0.00 | 0.00 | 0.00 | 0.08 | 0.10 |
| Example 7 | | (+)-catechin | | 0.00 | 0.00 | 0.04 | 0.00 | 0.06 | 0.11 |
| Example 8 | | Epigallocatechin gallate | | 0.02 | 0.00 | 0.00 | 0.00 | 0.07 | 0.15 |

TABLE 8-continued

Short-term stress condition of 70° C., 48 hr, Procedure 1 of impurities analysis

| | Stabilizer 1 | Stabilizer 2 | Stabilizer 3 | RRT 0.33[1) | RRT 0.48[2) | RRT 0.53[3) | RRT 0.7[4) | RRT 1.2[5) | Total |
|---|---|---|---|---|---|---|---|---|---|
| Example 9 | | Ascorbic acid | | 0.00 | 0.00 | 0.00 | 0.00 | 0.06 | 0.09 |
| Example 10 | | Isoascorbic acid | | 0.00 | 0.00 | 0.00 | 0.00 | 0.08 | 0.13 |
| Example 11 | Monothioglycerol | tea catechin | — | 0.00 | 0.00 | 0.00 | 0.00 | 0.12 | 0.20 |
| Example 12 | | (+)-catechin | — | 0.00 | 0.00 | 0.04 | 0.00 | 0.14 | 0.19 |
| Example 13 | | Epigallocatechin gallate | — | 0.00 | 0.00 | 0.03 | 0.00 | 0.14 | 0.21 |
| Comparative Example 1 | — | — | — | 0.02 | 0.00 | 0.23 | 0.31 | 1.00 | 1.76 |
| Comparative Example 2 | Potassium thiocyanate | — | — | 0.00 | 0.00 | 0.13 | 0.00 | 0.00 | 0.20 |
| Comparative Example 3 | — | Monothioglycerol | — | 0.13 | 0.00 | 0.05 | 0.00 | 0.09 | 0.34 |
| Comparative Example 4 | Potassium thiocyanate | Monothioglycerol | — | 0.00 | 0.00 | 0.07 | 0.00 | 0.07 | 0.20 |
| Comparative Example 5 | — | Citric acid | — | 0.00 | 0.09 | 0.09 | 0.00 | 0.73 | 0.91 |
| Comparative Example 6 | — | Tartaric acid | — | 0.00 | 0.00 | 0.09 | 0.00 | 0.80 | 0.91 |
| Comparative Example 7 | — | Benzoic acid | — | 0.00 | 0.00 | 0.09 | 0.39 | 1.33 | 2.06 |
| Comparative Example 8 | Potassium thiocyanate | Citric acid | — | 0.00 | 0.04 | 0.09 | 0.00 | 0.07 | 0.22 |
| Comparative Example 9 | Monothioglycerol | Tartaric acid | — | 0.00 | 0.05 | 0.10 | 0.05 | 0.06 | 0.29 |
| Comparative Example 10 | | Benzoic acid | — | 0.00 | 0.11 | 0.10 | 0.00 | 0.05 | 0.33 |
| Comparative Example 11 | | Citric acid | — | 0.05 | 0.00 | 0.06 | 0.00 | 0.39 | 0.55 |
| Comparative Example 12 | | Tartaric acid | — | 0.03 | 0.03 | 0.06 | 0.08 | 0.46 | 0.68 |
| Comparative Example 13 | | Benzoic acid | — | 0.04 | 0.03 | 0.10 | 0.05 | 0.42 | 0.67 |
| Comparative Example 14 | Potassium thiocyanate | Monothioglycerol | Citric acid | 0.03 | 0.00 | 0.06 | 0.00 | 0.12 | 0.23 |
| Comparative Example 15 | | | Tartaric acid | 0.00 | 0.04 | 0.05 | 0.00 | 0.09 | 0.40 |
| Comparative Example 16 | | | Benzoic acid | 0.03 | 0.04 | 0.07 | 0.00 | 0.07 | 0.23 |
| Comparative Example 17 | — | 2-mercaptobenzimidazole | Isoascorbic acid | 0.02 | 0.00 | 0.01 | 0.04 | 0.04 | 0.14 |
| Comparative Example 18 | — | 2,6-di-t-butyl-4-methylphenol | 2-mercaptobenzimidazole | 0.00 | 0.00 | 0.10 | 0.00 | 0.00 | 0.13 |
| Comparative Example 19 | — | 2-mercaptobenzimidazole | Rutin | 0.02 | 0.12 | 0.11 | 0.00 | 0.00 | 0.28 |
| Comparative Example 20 | — | Sodium hydroxymethane sulfonate | 2,6-di-t-butyl-4-methylphenol | 0.14 | 0.00 | 0.06 | 0.16 | 0.13 | 0.72 |
| Comparative Example 21 | — | Sodium metabisulfite | Ascorbic acid | 0.03 | 0.00 | 0.00 | 0.02 | 0.44 | 0.57 |
| Comparative Example 22 | — | Ethylenediaminetetraacetic acid (EDTA) | — | 0.00 | 0.00 | 0.16 | 0.15 | 0.79 | 1.17 |
| Comparative Example 23 | — | Cysteine | — | 0.00 | 0.00 | 0.07 | 0.00 | 0.26 | 0.36 |
| Comparative Example 24 | — | 2-mercaptobenzimidazole | — | 0.00 | 0.00 | 0.07 | 0.00 | 0.02 | 0.08 |
| Comparative Example 25 | — | Butylhydroxyanisole | — | 0.00 | 0.00 | 0.49 | 2.23 | 2.76 | 5.85 |
| Comparative Example 26 | — | 2,6-di-t-butyl-4-methylphenol | — | 0.00 | 0.00 | 0.14 | 0.42 | 0.78 | 1.47 |
| Comparative Example 27 | — | Pentaerythrityl tetra-di-t-butyl hydroxyhydrocinnamate | — | 0.00 | 0.00 | 0.28 | 0.59 | 1.21 | 2.18 |
| Comparative Example 28 | — | Quercetin dihydrate | — | 0.00 | 0.00 | 0.08 | 0.00 | 0.75 | 0.86 |
| Comparative Example 29 | — | Hydroquinone | — | 0.00 | 0.00 | 0.44 | 0.00 | 1.92 | 4.13 |
| Comparative Example 30 | — | Sodium hydroxymethane sulfonate | — | 0.00 | 0.00 | 0.00 | 0.15 | 0.23 | 0.53 |
| Comparative Example 31 | — | Sodium metabisulfite | — | 0.00 | 0.00 | 0.00 | 0.12 | 0.22 | 0.43 |
| Comparative Example 32 | — | Sodium sulfite | — | 0.00 | 0.00 | 0.18 | 0.25 | 0.98 | 1.48 |

TABLE 8-continued

Short-term stress condition of 70° C., 48 hr, Procedure 1 of impurities analysis

| | Stabilizer 1 | Stabilizer 2 | Stabilizer 3 | Content (%) of each impurity according to RRT | | | | | |
|---|---|---|---|---|---|---|---|---|---|
| | | | | RRT 0.33[1] | RRT 0.48[2] | RRT 0.53[3] | RRT 0.7[4] | RRT 1.2[5] | Total |
| Comparative Example 33 | — | Sodium thiosulfate | — | 0.00 | 0.00 | 0.10 | 0.06 | 0.09 | 0.28 |
| Comparative Example 34 | — | Propyl gallate | — | 0.00 | 0.00 | 1.12 | 0.08 | 1.69 | 3.05 |
| Comparative Example 35 | — | 1,3-butanediol | — | 0.00 | 0.00 | 0.21 | 0.34 | 0.92 | 1.56 |
| Comparative Example 36 | — | (+)-alpha-tocopherol | — | 0.00 | 0.00 | 4.65 | 6.12 | 11.01 | 24.07 |
| Comparative Example 37 | — | Alpha-tocopherol acetate | — | 0.00 | 0.00 | 0.14 | 0.34 | 0.77 | 1.40 |
| Comparative Example 38 | — | Benzotriazole | — | 0.06 | 0.13 | 0.28 | 0.40 | 1.33 | 2.40 |
| Comparative Example 39 | — | Rutin | — | 0.00 | 0.00 | 0.33 | 0.11 | 0.83 | 1.37 |
| Comparative Example 40 | — | Ascorbic acid | — | 0.03 | 0.00 | 0.12 | 0.04 | 0.54 | 0.77 |
| Comparative Example 41 | — | Isoascorbic acid | — | 0.02 | 0.00 | 0.04 | 0.06 | 0.56 | 0.74 |
| Comparative Example 42 | — | Tea catechin | — | 0.00 | 0.00 | 0.08 | 0.03 | 0.68 | 0.82 |
| Comparative Example 43 | — | (+)-catechin | — | 0.00 | 0.00 | 0.07 | 0.01 | 0.81 | 0.92 |
| Comparative Example 44 | — | Epigallocatechin gallate | — | 0.00 | 0.00 | 0.16 | 0.03 | 0.60 | 0.91 |
| Comparative Example 45 | — | 2,6-di-t-butyl-4-methylphenol | Tea catechin | 0.00 | 0.00 | 0.05 | 0.00 | 0.34 | 0.42 |
| Comparative Example 46 | — | Butylhydroxyanisole | Tea catechin | 0.00 | 0.07 | 0.21 | 0.00 | 0.53 | 0.97 |
| Comparative Example 47 | — | Sodium thiosulfate | Tea catechin | 0.03 | 0.00 | 0.14 | 0.20 | 0.56 | 1.09 |
| Comparative Example 48 | — | 2,6-di-t-butyl-4-methylphenol | Isoascorbic acid | 0.00 | 0.00 | 0.00 | 0.05 | 0.33 | 0.52 |
| Comparative Example 49 | — | Butylhydroxyanisole | Isoascorbic acid | 0.00 | 0.00 | 0.00 | 0.00 | 0.35 | 0.57 |
| Comparative Example 50 | Potassium thiocyanate | Ethylenediaminetetraacetic acid (EDTA) | | 0.00 | 0.05 | 0.12 | 0.00 | 0.06 | 0.25 |
| Comparative Example 51 | | Cysteine | | 0.00 | 0.00 | 0.08 | 0.00 | 0.04 | 0.15 |
| Comparative Example 52 | | 2-mercaptobenzimidazole | | 0.00 | 0.07 | 0.10 | 0.00 | 0.02 | 0.19 |
| Comparative Example 53 | | Butylhydroxyanisole | | 0.00 | 0.97 | 0.97 | 0.16 | 0.05 | 1.29 |
| Comparative Example 54 | | Dibutylhydroxytoluene | | 0.00 | 0.06 | 0.16 | 0.00 | 0.04 | 0.28 |
| Comparative Example 55 | | Pentaerythrityl tetra-di-t-butyl hydroxyhydrocinnamate | | 0.00 | 0.05 | 0.05 | 0.00 | 0.02 | 0.18 |
| Comparative Example 56 | | Quercetin dihydrate | | 0.00 | 0.05 | 0.17 | 0.00 | 0.05 | 0.36 |
| Comparative Example 57 | | Hydroquinone | | 0.00 | 0.06 | 1.11 | 0.00 | 0.90 | 4.24 |
| Comparative Example 58 | | Sodium hydroxymethane sulfonate | | 0.00 | 0.09 | 0.11 | 0.00 | 0.05 | 0.29 |
| Comparative Example 59 | | Sodium metabisulfite | | 0.00 | 0.03 | 0.17 | 0.00 | 0.03 | 0.31 |
| Comparative Example 60 | | Sodium sulfite | | 0.00 | 0.06 | 0.00 | 0.00 | 0.03 | 0.23 |
| Comparative Example 61 | | Sodium thiosulfate | | 0.00 | 0.03 | 0.09 | 0.00 | 0.03 | 0.15 |
| Comparative Example 62 | | Propyl gallate | | 0.00 | 0.13 | 0.79 | 0.09 | 0.05 | 1.67 |
| Comparative Example 63 | | 1,3-butanediol | | 0.00 | 0.06 | 0.11 | 0.00 | 0.05 | 0.25 |
| Comparative Example 64 | | (+)-alpha-tocopherol | | 0.00 | 0.16 | 8.26 | 0.85 | 0.44 | 9.80 |
| Comparative Example 65 | | Alpha-tocopherol acetate | | 0.00 | 0.06 | 0.12 | 0.00 | 0.03 | 0.24 |
| Comparative Example 66 | | Benzotriazole | | 0.00 | 0.12 | 0.13 | 0.00 | 0.03 | 0.38 |

TABLE 8-continued

Short-term stress condition of 70° C., 48 hr, Procedure 1 of impurities analysis

| | Stabilizer 1 | Stabilizer 2 | Stabilizer 3 | RRT 0.33[1)] | RRT 0.48[2)] | RRT 0.53[3)] | RRT 0.7[4)] | RRT 1.2[5)] | Total |
|---|---|---|---|---|---|---|---|---|---|
| Comparative Example 67 | | Rutin | | 0.00 | 0.00 | 0.11 | 0.00 | 0.08 | 0.24 |
| Comparative Example 68 | Monothioglycerol | Ethylenediaminetetraacetic acid (EDTA) | | 0.02 | 0.02 | 0.07 | 0.00 | 0.23 | 0.32 |
| Comparative Example 69 | | Cysteine | | 0.00 | 0.00 | 0.12 | 0.00 | 0.25 | 0.41 |
| Comparative Example 70 | | 2-mercaptobenzimidazole | | 0.00 | 0.00 | 0.06 | 0.00 | 0.05 | 0.11 |
| Comparative Example 71 | | Butylhydroxyanisole | | 0.00 | 0.00 | 0.33 | 0.00 | 0.27 | 0.75 |
| Comparative Example 72 | | Dibutylhydroxytoluene | | 0.02 | 0.02 | 0.08 | 0.00 | 0.19 | 0.29 |
| Comparative Example 73 | | Pentaerythrityl tetra-di-t-butyl hydroxyhydrocinnamate | | 0.00 | 0.00 | 0.09 | 0.00 | 0.18 | 0.29 |
| Comparative Example 74 | | Quercetin dihydrate | | 0.00 | 0.00 | 0.05 | 0.00 | 0.28 | 0.35 |
| Comparative Example 75 | | Hydroquinone | | 0.00 | 0.00 | 0.08 | 0.00 | 0.19 | 0.28 |
| Comparative Example 76 | | Sodium hydroxymethane sulfonate | | 0.15 | 0.15 | 0.06 | 0.09 | 0.19 | 0.55 |
| Comparative Example 77 | | Sodium metabisulfite | | 0.06 | 0.06 | 0.09 | 0.00 | 0.27 | 0.42 |
| Comparative Example 78 | | Sodium sulfite | | 0.04 | 0.00 | 0.07 | 0.00 | 0.21 | 0.34 |
| Comparative Example 79 | | Sodium thiosulfate | | 0.03 | 0.00 | 0.08 | 0.00 | 0.17 | 0.27 |
| Comparative Example 80 | | Propyl gallate | | 0.00 | 0.00 | 0.07 | 0.00 | 0.34 | 0.44 |
| Comparative Example 81 | | 1,3-butanediol | | 0.03 | 0.00 | 0.05 | 0.00 | 0.23 | 0.32 |
| Comparative Example 82 | | (+)-alpha-tocopherol | | 0.05 | 0.00 | 1.31 | 0.07 | 0.37 | 1.80 |
| Comparative Example 83 | | Alpha-tocopherol acetate | | 0.00 | 0.00 | 0.06 | 0.00 | 0.17 | 0.25 |
| Comparative Example 84 | | Benzotriazole | | 0.04 | 0.06 | 0.11 | 0.00 | 0.21 | 0.48 |
| Comparative Example 85 | | Rutin | | 0.00 | 0.00 | 0.06 | 0.00 | 0.22 | 0.38 |
| Comparative Example 86 | | Isoascorbic acid | | 0.00 | 0.00 | 0.00 | 0.03 | 0.12 | 0.16 |
| Comparative Example 87 | Potassium thiocyanate | Ethylenediaminetetraacetic acid (EDTA) | Monothioglycerol | 0.00 | 0.06 | 0.09 | 0.00 | 0.03 | 0.22 |
| Comparative Example 88 | | Cysteine | | 0.00 | 0.05 | 0.07 | 0.00 | 0.04 | 0.18 |
| Comparative Example 89 | | 2-mercaptobenzimidazole | | 0.04 | 0.00 | 0.07 | 0.00 | 0.03 | 0.17 |
| Comparative Example 90 | | Butylhydroxyanisole | | 0.00 | 0.03 | 0.50 | 0.00 | 0.05 | 0.71 |
| Comparative Example 91 | | Dibutylhydroxytoluene | | 0.00 | 0.06 | 0.12 | 0.00 | 0.03 | 0.25 |
| Comparative Example 92 | | Pentaerythrityl tetra-di-t-butyl hydroxyhydrocinnamate | | 0.00 | 0.10 | 0.12 | 0.00 | 0.04 | 0.32 |
| Comparative Example 93 | | Quercetin dihydrate | | 0.00 | 0.03 | 0.03 | 0.00 | 0.04 | 0.11 |
| Comparative Example 94 | | Hydroquinone | | 0.00 | 0.05 | 0.61 | 0.00 | 0.32 | 2.24 |
| Comparative Example 95 | | Sodium hydroxymethane sulfonate | | 0.06 | 0.08 | 0.09 | 0.00 | 0.09 | 0.44 |
| Comparative Example 96 | | Sodium metabisulfite | | 0.00 | 0.03 | 0.08 | 0.00 | 0.03 | 0.19 |
| Comparative Example 97 | | Sodium sulfite | | 0.00 | 0.12 | 0.09 | 0.00 | 0.05 | 0.31 |
| Comparative Example 98 | | Sodium thiosulfate | | 0.00 | 0.03 | 0.11 | 0.00 | 0.03 | 0.19 |
| Comparative Example 99 | | Propyl gallate | | 0.00 | 0.07 | 0.23 | 0.00 | 0.05 | 0.58 |
| Comparative Example 100 | | 1,3-butanediol | | 0.00 | 0.04 | 0.08 | 0.00 | 0.03 | 0.20 |

TABLE 8-continued

Short-term stress condition of 70° C., 48 hr, Procedure 1 of impurities analysis

| | | | Content (%) of each impurity according to RRT | | | | | |
|---|---|---|---|---|---|---|---|---|
| Stabilizer 1 | Stabilizer 2 | Stabilizer 3 | RRT 0.33[1] | RRT 0.48[2] | RRT 0.53[3] | RRT 0.7[4] | RRT 1.2[5] | Total |
| Comparative Example 101 | (+)-alpha-tocopherol | | 0.00 | 0.07 | 3.95 | 0.27 | 0.19 | 4.54 |
| Comparative Example 102 | Alpha-tocopherol acetate | | 0.00 | 0.05 | 0.08 | 0.00 | 0.05 | 0.21 |
| Comparative Example 103 | Benzotriazole | | 0.04 | 0.14 | 0.10 | 0.00 | 0.03 | 0.35 |
| Comparative Example 104 | Rutin | | 0.00 | 0.00 | 0.05 | 0.00 | 0.09 | 0.19 |

[1]RRT 0.33: Desbenzyldonepezil, within 0.5%
[2]RRT 0.48: Unknown impurities, within 0.2%
[3]RRT 0.53: Unknown impurities, within 0.2%
[4]RRT 0.7: Donepezil open ring, within 0.5%
[5]RRT 1.2: Donepezil N-oxide, within 0.5%

<Experimental Example 2> Impurities Evaluation by Procedure 2 after Short-Term Stress Conditions 70° c. for 48 Hours Percutaneous absorption preparations of examples and comparative examples were tested for donepezil impurities according to Procedure 2 as below, after short-term stress condition of 48 hours of storage at 70° C.

1. Impurities Analysis by Procedure 2

As for Procedure 2 for impurities analysis, each percutaneous absorption preparation was dissolved in ethyl acetate for 60 minutes by stirring, and then added to a mixture solution of 0.1N hydrochloric acid and methanol of respective ratio 25:75, stirred for 60 minutes, and centrifuged for 5 minutes. The supernatant was used as sample solution and evaluated according to the criteria of Table 10 below according to Procedure 2 of the U.S. Pharmacopeia. The standard solution was prepared so that the concentration of donepezil hydrochloride standard was 10 ug/mL using a solvent mixture of ethyl acetate:methanol:0.1 N hydrochloric acid=100: 675:225 (volume ratio).

<Procedure 2: Liquid Chromatography Conditions>
Column: Capcellpak (4.6×250 mm, C18.5 um)
Mobile phase A: Add 1 mL of phosphoric acid in 1 L of purified water. Adjust with triethylamine to a pH of 6.5. Pass through a filter, remove bubbles, and use as mobile phase.
Mobile phase B: Acetonitrile

| Time (minutes) | Mobile phase A (%) | Mobile phase B (%) |
|---|---|---|
| 0 | 75 | 25 |
| 10 | 40 | 60 |
| 40 | 40 | 60 |
| 41 | 75 | 25 |
| 50 | 75 | 25 |

Column temperature: 50° C.
Flow rate: 1.5 mL/min
Injection size: 20 uL
UV wavelength: 286 nm
Calculation:
Impurity %=(Ru/Rs)×(Cs/Cu)×(1/F)×100
Ru: peak response of any individual impurity from the sample solution
Rs: peak response of donepezil from the standard solution
Cs: concentration in the standard solution (mg/mL)
Cu: concentration in the sample solution (mg/mL)
F: relative correction factor for each impurity

| Impurity | Relative retention time (RRT) | Relative correction factor (F) | Acceptance criteria (%) |
|---|---|---|---|
| Desbenzyl donepezil | 0.23 | 1.5 | 0.15 |
| Donepezil pyridine analog | 0.49 | 1.9 | 0.15 |
| Donepezil quaternary salt | 0.68 | 0.74 | 0.15 |
| Donepezil indene analog | 1.7 | 2.2 | 0.15 |
| Deoxydonepezil | 2.1 | 1.3 | 0.15 |
| Any individual degradation product | — | 1.0 | 0.1 |
| Total impurities | — | — | 1.0 |

2. Impurities Evaluation

The percutaneous absorption preparations of the examples according to the present invention and comparative examples were subject to short-term stress condition of storage for 48 hours at 70° C., and then tested for donepezil impurities according to Procedure 2. The results are shown in Table 9.

As seen from Table 9 below, the percutaneous absorption preparation without stabilizer (Comparative Example 1), when analyzed with Procedure 2, produced impurities above criteria from donepezil decomposition at the relative retention time 0.49 (Donepezil pyridine analog), 0.57 (unknown related substances), 1.08 (unknown related substances), and total impurities, showing that stabilizers are necessary for the preparation.

As for the percutaneous absorption preparations comprising the stabilizers potassium thiocyanate (Comparative Example 2) or monothioglycerol (Comparative Example 3) described in Korean Patent Application No. 2018-0167289 or a mixture of the two (Comparative Example 4), the amount of impurities produced under short-term stress condition (70° C. 48 hour storage) met the criteria of Procedure 2 proposed by the U.S. Pharmacopeia, confirming outstanding stability.

Comparative Examples 5 through 7 using citric acid, tartaric acid, and benzoic acid, which are the organic acids described in U.S. Pat. No. 6,372,760, were inadequate by Procedure 2 presented in the United States Pharmacopeia. Comparative Examples 8 through 16, which are Comparative Examples 2 through 4 with the above-mentioned stabilizers added, were inadequate by Procedure 2 of the U.S. Pharmacopoeia, even though they met the criteria of Procedure 1.

In the case of Comparative Examples 17 through 21 using a combination of two stabilizers described in Korean Registered Patent Publication No. 10-1408500 or Korean Registered Patent Publication No. 10-1408454, the impurities did not meet the criteria of Procedure 2 presented in the U.S. Pharmacopeia under short-term stress conditions even though they met the criteria of Procedure 1.

Comparative Examples 22 through 44, which are percutaneous absorption preparations with stabilizers described in Korean Patent Application Publication No. 10-2009-0086565 and conventionally known stabilizers added, all failed to meet the criteria of Procedure 2, even though some met the criteria of Procedure 1 under short-term stress condition.

Also, Comparative Examples 45 through 49, which have a mixture of. stabilizers described in Korean Patent Publication No. 10-2009-0086565 and a conventionally known stabilizer also failed to meet the criteria of Procedure 2.

As for Comparative Examples 50 through 67, which are percutaneous absorption preparations containing potassium thiocyanate, a stabilizer described in Korean Patent Application No. 2018-0167289, and one of the stabilizers described in Korean Patent Application Publication No. 10-2009-0086565, all but Comparative Example 67 (potassium thiocyanate/rutin) failed to meet the criteria of Procedure 2 of the U.S. Pharmacopoeia, even though most met the criteria of Procedure 1 of short-term stress condition.

As for Comparative Examples 68 through 86, which are percutaneous absorption preparations with stabilizer described in Korean Patent Application No. 2018-0167289 mixed with one of the stabilizers described in Korean Patent Publication No. 10-2009-0086565, even though most of them met the criteria of Procedure 1 for the impurities under short-term stress condition, only Comparative Example 68 (monothioglycerol/ethylenediaminetetraacetic acid), Comparative Example 70 (monothioglycerol/2-mercaptobenzimidazole), Comparative Example 72 (monothioglycerol/dibutylhydroxytoluene), Comparative Example 74 (monothioglycerol/quercetin dihydrate), Comparative Example 75 (monothio Glycerol/hydroquinone), Comparative Example 78 (monothioglycerol/sodium sulfite), Comparative Example 79 (monothioglycerol/sodium thiosulfate), Comparative Example 80 (monothioglycerol/propyl gallate), Comparative Example 81 (monothioglycerol/1,3-butanediol), comparative example 82 (monothioglycerol/alpha-tocopherol acetate), comparative example 85 (monothioglycerol/routine) and comparative example 86 (monothioglycerol/isoascorbic acid) met the criteria of Procedure 2 of the United States Pharmacopeia. Comparative Example 69 (monothioglycerol/cysteine), Comparative Example 71 (monothioglycerol/butylhydroxyanisole), Comparative Example 73 (monothioglycerol/pentaerythryltetra-di-t-butylhydroxyhydrocinnamate), Comparative Example 76 (monothioglycerol/sodium hydroxymethanesulfonate), Comparative Example 77 (monothioglycerol/sodium metabisulfite), Comparative Example 82 (monothioglycerol/(+)-alpha-tocopherol) and Comparative Example 84 (monothioglycerol/benzo-triazole) did not meet the criteria of Procedure 2 presented in the United States Pharmacopeia.

Also, as for Comparative Examples 87 through 104, percutaneous absorption preparations containing monothioglycerol and potassium thiocyanate (stabilizers described in Korean Patent Application No. 2018-0167289) and one of the stabilizers described in Korean Patent Application Publication No. 10-2009-0086565, all but Comparative Example 104 (monothioglycerol/potassium thiocyanate/rutin) failed to meet the criteria of Procedure 2 of the U.S. Pharmacopoeia, even though most met the criteria of Procedure 1 of short-term stress condition.

On the other hand, Examples 1 through 13 according to the present invention met the criteria of Procedure 2 suggested by the United States Pharmacopeia under short-term stress conditions in terms of individual impurities, demonstrating outstanding stabilizing effect.

TABLE 9

Short-term stress condition of 70° C., 48 hr, Procedure 2 of impurities analysis

| | | | | Content (%) of each impurity according to RRT | | | | | | | | |
|---|---|---|---|---|---|---|---|---|---|---|---|---|
| Example No. | Stabilizer 1 | Stabilizer 2 | Stabilizer 3 | RRT 0.23[1)] | RRT 0.49[2)] | RRT 0.57[3)] | RRT 0.68[4)] | RRT 1.03[5)] | RRT 1.08[6)] | RRT 1.7[7)] | RRT 2.1[8)] | TOTAL |
| Example 1 | Potassium thiocyanate | Tea catechin | — | 0.04 | 0.03 | 0.03 | 0.00 | 0.00 | 0.00 | 0.00 | 0.00 | 0.27 |
| Example 2 | | (+)-catechin | — | 0.06 | 0.03 | 0.06 | 0.00 | 0.00 | 0.00 | 0.00 | 0.00 | 0.25 |
| Example 3 | | Epigallocatechin gallate | — | 0.03 | 0.04 | 0.05 | 0.00 | 0.00 | 0.00 | 0.00 | 0.00 | 0.35 |
| Example 4 | | Ascorbic acid | — | 0.00 | 0.05 | 0.00 | 0.00 | 0.00 | 0.00 | 0.00 | 0.00 | 0.12 |
| Example 5 | | Isoascorbic acid | — | 0.00 | 0.04 | 0.01 | 0.00 | 0.00 | 0.00 | 0.00 | 0.00 | 0.11 |
| Example 6 | | Tea catechin | | 0.03 | 0.03 | 0.02 | 0.00 | 0.00 | 0.00 | 0.00 | 0.00 | 0.19 |
| Example 7 | | (+)-catechin | | 0.01 | 0.03 | 0.04 | 0.00 | 0.00 | 0.00 | 0.00 | 0.00 | 0.16 |
| Example 8 | | Epigallocatechin gallate | Monothioglycerol | 0.00 | 0.04 | 0.02 | 0.00 | 0.00 | 0.00 | 0.00 | 0.00 | 0.19 |
| Example 9 | | Ascorbic acid | | 0.00 | 0.04 | 0.00 | 0.00 | 0.00 | 0.00 | 0.00 | 0.00 | 0.12 |
| Example 10 | | Isoascorbic acid | | 0.00 | 0.04 | 0.01 | 0.00 | 0.00 | 0.00 | 0.00 | 0.00 | 0.10 |
| Example 11 | Monothioglycerol | Tea catechin | — | 0.04 | 0.07 | 0.01 | 0.00 | 0.00 | 0.00 | 0.00 | 0.00 | 0.20 |
| Example 12 | | (+)-catechin | — | 0.01 | 0.07 | 0.04 | 0.00 | 0.00 | 0.00 | 0.00 | 0.00 | 0.19 |
| Example 13 | | Epigallocatechin gallate | — | 0.01 | 0.07 | 0.02 | 0.00 | 0.00 | 0.00 | 0.00 | 0.00 | 0.22 |
| Comparative Example 1 | — | — | — | 0.04 | 0.48 | 0.32 | 0.00 | 0.00 | 0.12 | 0.00 | 0.00 | 1.42 |
| Comparative Example 2 | Potassium thiocyanate | — | — | 0.01 | 0.00 | 0.07 | 0.00 | 0.00 | 0.00 | 0.00 | 0.00 | 0.46 |
| Comparative Example 3 | — | Monothioglycerol | — | 0.06 | 0.04 | 0.06 | 0.00 | 0.00 | 0.00 | 0.00 | 0.00 | 0.26 |

TABLE 9-continued

Short-term stress condition of 70° C., 48 hr, Procedure 2 of impurities analysis Content (%) of each impurity according to RRT

| Example No. | Stabilizer 1 | Stabilizer 2 | Stabilizer 3 | RRT 0.23[1] | RRT 0.49[2] | RRT 0.57[3] | RRT 0.68[4] | RRT 1.03[5] | RRT 1.08[6] | RRT 1.7[7] | RRT 2.1[8] | TOTAL |
|---|---|---|---|---|---|---|---|---|---|---|---|---|
| Comparative Example 4 | Potassium thiocyanate | Monothioglycerol | — | 0.00 | 0.03 | 0.09 | 0.00 | 0.00 | 0.00 | 0.00 | 0.00 | 0.22 |
| Comparative Example 5 | — | Citric acid | — | 0.00 | 0.38 | 0.09 | 0.00 | 0.00 | 0.00 | 0.00 | 0.00 | 0.53 |
| Comparative Example 6 | — | Tartaric acid | — | 0.00 | 0.43 | 0.12 | 0.00 | 0.00 | 0.00 | 0.00 | 0.00 | 0.56 |
| Comparative Example 7 | — | Benzoic acid | — | 0.12 | 0.54 | 0.10 | 0.00 | 0.00 | 0.52 | 0.00 | 0.00 | 1.87 |
| Comparative Example 8 | Potassium thiocyanate | Citric acid | — | 0.00 | 0.00 | 0.11 | 0.05 | 0.00 | 0.00 | 0.00 | 0.00 | 0.27 |
| Comparative Example 9 | | Tartaric acid | — | 0.00 | 0.00 | 0.11 | 0.05 | 0.00 | 0.00 | 0.00 | 0.00 | 0.27 |
| Comparative Example 10 | | Benzoic acid | — | 0.00 | 0.00 | 0.11 | 0.05 | 0.00 | 0.00 | 0.00 | 0.00 | 0.35 |
| Comparative Example 11 | Monothioglycerol | Citric acid | — | 0.01 | 0.21 | 0.08 | 0.05 | 0.00 | 0.08 | 0.00 | 0.00 | 0.58 |
| Comparative Example 12 | | Tartaric acid | — | 0.01 | 0.21 | 0.07 | 0.01 | 0.00 | 0.09 | 0.00 | 0.00 | 0.56 |
| Comparative Example 13 | | Benzoic acid | — | 0.02 | 0.16 | 0.11 | 0.05 | 0.00 | 0.05 | 0.00 | 0.00 | 0.73 |
| Comparative Example 14 | Potassium thiocyanate | Monothioglycerol | Citric acid | 0.00 | 0.06 | 0.10 | 0.03 | 0.00 | 0.00 | 0.00 | 0.00 | 0.21 |
| Comparative Example 15 | | Monothioglycerol | Tartaric acid | 0.00 | 0.05 | 0.37 | 0.02 | 0.00 | 0.00 | 0.00 | 0.00 | 0.52 |
| Comparative Example 16 | | Monothioglycerol | Benzoic acid | 0.00 | 0.02 | 0.11 | 0.05 | 0.00 | 0.00 | 0.00 | 0.00 | 0.26 |
| Comparative Example 17 | | Isoascorbic acid | 2-mercapto-benzimidazole | 0.00 | 0.02 | 0.11 | 0.05 | 0.00 | 0.00 | 0.00 | 0.00 | 0.35 |
| Comparative Example 18 | | 2-mercaptobenzimidazole | 2,6-di-t-butyl-4-methylphenol | 0.01 | 0.00 | 0.16 | 0.00 | 2.11 | 0.00 | 0.00 | 0.00 | 2.41 |
| Comparative Example 19 | | 2-mercaptobenzimidazole | Rutin | 0.01 | 0.00 | 0.12 | 0.00 | 1.15 | 0.00 | 0.00 | 0.00 | 1.54 |
| Comparative Example 20 | | 2,6-di-t-butyl-4-methylphenol | Sodium hydroxymethane sulfonate | 0.00 | 0.01 | 0.19 | 0.06 | 0.73 | 0.07 | 0.00 | 0.00 | 1.35 |
| Comparative Example 21 | | Ascorbic acid | Sodium metabisulfite | 0.01 | 0.25 | 0.02 | 0.00 | 0.00 | 0.00 | 0.00 | 0.00 | 0.34 |
| Comparative Example 22 | | Ethylene-diaminetetraacetic acid (EDTA) | — | 0.05 | 0.41 | 0.27 | 0.06 | 0.00 | 0.14 | 0.00 | 0.00 | 1.15 |
| Comparative Example 23 | | Cysteine | — | 0.00 | 0.14 | 0.12 | 0.00 | 0.00 | 0.00 | 0.00 | 0.00 | 0.28 |
| Comparative Example 24 | | 2-mercaptobenzimidazole | — | 0.00 | 0.00 | 0.08 | 0.00 | 4.48 | 0.00 | 0.00 | 0.00 | 4.68 |
| Comparative Example 25 | | Butylhydroxyanisole | — | 0.65 | 0.29 | 0.73 | 0.00 | 0.00 | 2.93 | 0.00 | 0.00 | 4.81 |
| Comparative Example 26 | | 2,6-di-t-butyl-4-methylphenol | — | 0.16 | 0.24 | 0.19 | 0.03 | 0.00 | 0.46 | 0.00 | 0.00 | 1.38 |
| Comparative Example 27 | | Pentaerythrityl tetra-di-t-butyl hydroxyhydrocinnamate | — | 0.21 | 0.51 | 0.43 | 0.08 | 0.00 | 0.48 | 0.00 | 0.00 | 2.15 |
| Comparative Example 28 | | Quercetin dihydrate | — | 0.00 | 0.43 | 0.22 | 0.00 | 0.00 | 0.00 | 0.00 | 0.00 | 0.72 |
| Comparative Example 29 | | Hydroquinone | — | 0.00 | 0.37 | 0.66 | 0.06 | 0.00 | 1.06 | 0.00 | 0.00 | 5.30 |
| Comparative Example 30 | | Sodium hydroxymethane sulfonate | — | 0.19 | 0.09 | 0.10 | 0.00 | 0.00 | 0.12 | 0.00 | 0.00 | 1.29 |
| Comparative Example 31 | | Sodium metabisulfite | — | 0.04 | 0.07 | 0.07 | 0.00 | 0.00 | 0.14 | 0.00 | 0.00 | 0.43 |
| Comparative Example 32 | | Sodium sulfite | — | 0.08 | 0.49 | 0.25 | 0.06 | 0.00 | 0.16 | 0.00 | 0.00 | 1.36 |
| Comparative Example 33 | | Sodium thiosulfate | — | 0.01 | 0.03 | 0.12 | 0.05 | 0.00 | 0.04 | 0.00 | 0.00 | 0.37 |
| Comparative Example 34 | | Propyl gallate | — | 0.00 | 0.86 | 1.97 | 0.00 | 0.00 | 0.03 | 0.00 | 0.00 | 3.00 |
| Comparative Example 35 | | 1,3-butanediol | — | 0.09 | 0.44 | 0.25 | 0.10 | 0.00 | 0.21 | 0.00 | 0.00 | 1.55 |
| Comparative Example 36 | | (+)-alpha-tocopherol | — | 1.72 | 1.31 | 7.16 | 0.00 | 0.00 | 11.04 | 0.00 | 0.00 | 22.98 |
| Comparative Example 37 | | Alpha-tocopherol acetate | — | 0.10 | 0.31 | 0.17 | 0.08 | 0.00 | 0.27 | 0.00 | 0.00 | 1.39 |

TABLE 9-continued

Short-term stress condition of 70° C., 48 hr, Procedure 2 of impurities analysis

| Example No. | Stabilizer 1 | Stabilizer 2 | Stabilizer 3 | RRT 0.23[1] | RRT 0.49[2] | RRT 0.57[3] | RRT 0.68[4] | RRT 1.03[5] | RRT 1.08[6] | RRT 1.7[7] | RRT 2.1[8] | TOTAL |
|---|---|---|---|---|---|---|---|---|---|---|---|---|
| Comparative Example 38 | | Benzotriazole | — | 0.08 | 0.74 | 0.43 | 0.00 | 0.00 | 0.12 | 0.00 | 0.00 | 2.03 |
| Comparative Example 39 | | Rutin | — | 0.01 | 0.28 | 0.18 | 0.00 | 0.00 | 0.00 | 0.00 | 0.00 | 0.51 |
| Comparative Example 40 | | Ascorbic acid | — | 0.01 | 0.27 | 0.02 | 0.00 | 0.00 | 0.00 | 0.00 | 0.00 | 0.47 |
| Comparative Example 41 | | Isoascorbic acid | — | 0.01 | 0.23 | 0.01 | 0.00 | 0.00 | 0.00 | 0.00 | 0.00 | 0.35 |
| Comparative Example 42 | | Tea catechin | — | 0.21 | 0.23 | 0.03 | 0.00 | 0.00 | 0.00 | 0.00 | 0.00 | 0.55 |
| Comparative Example 43 | | (+)-catechin | — | 0.00 | 0.23 | 0.05 | 0.00 | 0.00 | 0.00 | 0.00 | 0.00 | 0.35 |
| Comparative Example 44 | | Epigallocatechin gallate | — | 0.03 | 0.25 | 0.05 | 0.00 | 0.00 | 0.00 | 0.00 | 0.00 | 0.41 |
| Comparative Example 45 | | 2,6-di-t-butyl-4-methylphenol | Tea catechin | 0.07 | 0.18 | 0.06 | 0.00 | 0.00 | 0.00 | 0.00 | 0.00 | 0.38 |
| Comparative Example 46 | | Butylhydroxyanisole | Tea catechin | 0.10 | 0.28 | 0.28 | 0.00 | 0.59 | 5.54 | 0.00 | 0.00 | 6.87 |
| Comparative Example 47 | | Sodium thiosulfate | Tea catechin | 0.08 | 0.31 | 0.31 | 0.08 | 0.00 | 0.10 | 0.00 | 0.00 | 1.16 |
| Comparative Example 48 | | 2,6-di-t-butyl-4-methylphenol | Isoascorbic acid | 0.01 | 0.19 | 0.01 | 0.00 | 0.00 | 0.00 | 0.00 | 0.00 | 0.30 |
| Comparative Example 49 | | Butylhydroxyanisole | Isoascorbic acid | 0.01 | 0.18 | 0.01 | 0.00 | 0.00 | 0.00 | 0.00 | 0.00 | 0.24 |
| Comparative Example 50 | Potassium thiocyanate | Ethylenediaminetetraacetic acid (EDTA) | | 0.01 | 0.00 | 0.15 | 0.06 | 0.00 | 0.00 | 0.00 | 0.00 | 0.27 |
| Comparative Example 51 | | Cysteine | | 0.00 | 0.00 | 0.11 | 0.01 | 0.00 | 0.00 | 0.00 | 0.00 | 0.17 |
| Comparative Example 52 | | 2-mercaptobenzimidazole | | 0.00 | 0.00 | 0.10 | 0.03 | 4.31 | 0.00 | 0.00 | 0.00 | 4.75 |
| Comparative Example 53 | | Butylhydroxyanisole | | 0.04 | 0.00 | 1.48 | 0.05 | 0.70 | 6.28 | 0.00 | 0.00 | 8.64 |
| Comparative Example 54 | | Dibutylhydroxytoluene | | 0.01 | 0.00 | 0.20 | 0.06 | 0.00 | 0.00 | 0.00 | 0.00 | 0.32 |
| Comparative Example 55 | | Pentaerythrityl tetra-di-t-butyl hydroxyhydrocinnamate | | 0.01 | 0.00 | 0.22 | 0.06 | 0.00 | 0.04 | 0.00 | 0.00 | 0.39 |
| Comparative Example 56 | | Quercetin dihydrate | | 0.03 | 0.00 | 0.12 | 0.05 | 0.00 | 0.83 | 0.00 | 0.00 | 1.23 |
| Comparative Example 57 | | Hydroquinone | | 0.48 | 0.02 | 1.62 | 0.11 | 0.00 | 0.14 | 0.00 | 0.00 | 3.99 |
| Comparative Example 58 | | Sodium hydroxymethane sulfonate | | 0.02 | 0.00 | 0.14 | 0.00 | 0.00 | 0.04 | 0.00 | 0.00 | 0.65 |
| Comparative Example 59 | | Sodium metabisulfite | | 0.01 | 0.00 | 0.11 | 0.06 | 0.00 | 0.00 | 0.00 | 0.00 | 0.23 |
| Comparative Example 60 | | Sodium sulfite | | 0.01 | 0.00 | 0.11 | 0.06 | 0.00 | 0.00 | 0.00 | 0.00 | 0.23 |
| Comparative Example 61 | | Sodium thiosulfate | | 0.00 | 0.00 | 0.11 | 0.04 | 0.00 | 0.00 | 0.00 | 0.00 | 0.17 |
| Comparative Example 62 | | Propyl gallate | | 0.02 | 0.02 | 1.05 | 0.00 | 0.00 | 0.05 | 0.00 | 0.00 | 4.86 |
| Comparative Example 63 | | 1,3-butanediol | | 0.02 | 0.00 | 0.18 | 0.07 | 0.00 | 0.00 | 0.00 | 0.00 | 0.31 |
| Comparative Example 64 | | (+)-alpha-tocopherol | | 0.25 | 0.00 | 12.69 | 0.26 | 0.00 | 0.57 | 0.00 | 0.00 | 13.95 |
| Comparative Example 65 | | Alpha-tocopherol acetate | | 0.01 | 0.00 | 0.16 | 0.06 | 0.00 | 0.00 | 0.00 | 0.00 | 0.32 |
| Comparative Example 66 | | Benzotriazole | | 0.00 | 0.00 | 0.15 | 0.05 | 0.00 | 0.00 | 0.00 | 0.00 | 0.24 |
| Comparative Example 67 | | Rutin | | 0.00 | 0.05 | 0.06 | 0.00 | 0.00 | 0.00 | 0.00 | 0.00 | 0.40 |
| Comparative Example 68 | Monothioglycerol | Ethylenediaminetetraacetic acid (EDTA) | | 0.00 | 0.10 | 0.08 | 0.03 | 0.00 | 0.00 | 0.00 | 0.00 | 0.31 |
| Comparative Example 69 | | Cysteine | | 0.00 | 0.12 | 0.13 | 0.04 | 0.00 | 0.00 | 0.00 | 0.00 | 0.45 |
| Comparative Example 70 | | 2-mercaptobenzimidazole | | 0.00 | 0.00 | 0.08 | 0.02 | 0.00 | 0.00 | 0.00 | 0.00 | 0.11 |
| Comparative Example 71 | | Butylhydroxyanisole | | 0.00 | 0.10 | 0.49 | 0.02 | 0.68 | 5.96 | 0.00 | 0.00 | 7.27 |

TABLE 9-continued

Short-term stress condition of 70° C., 48 hr, Procedure 2 of impurities analysis

| Example No. | Stabilizer 1 | Stabilizer 2 | Stabilizer 3 | RRT 0.23[1] | RRT 0.49[2] | RRT 0.57[3] | RRT 0.68[4] | RRT 1.03[5] | RRT 1.08[6] | RRT 1.7[7] | RRT 2.1[8] | TOTAL |
|---|---|---|---|---|---|---|---|---|---|---|---|---|
| Comparative Example 72 | | Dibutylhydroxyloluene | | 0.00 | 0.09 | 0.09 | 0.02 | 0.00 | 0.03 | 0.00 | 0.00 | 0.30 |
| Comparative Example 73 | | Pentaerythrityl tetra-di-t-butyl hydroxyhydrocinnamate | | 0.00 | 0.10 | 0.11 | 0.02 | 0.00 | 0.03 | 0.00 | 0.00 | 0.33 |
| Comparative Example 74 | | Quercetin dihydrate | | 0.00 | 0.00 | 0.07 | 0.01 | 0.00 | 0.00 | 0.00 | 0.00 | 0.11 |
| Comparative Example 75 | | Hydroquinone | | 0.11 | 0.11 | 0.07 | 0.00 | 0.00 | 0.00 | 0.00 | 0.00 | 0.22 |
| Comparative Example 76 | | Sodium hydroxymethane sulfonate | | 0.06 | 0.07 | 0.05 | 0.15 | 0.00 | 0.11 | 0.00 | 0.00 | 1.20 |
| Comparative Example 77 | | Sodium metabisulfite | | 0.04 | 0.07 | 0.07 | 0.00 | 0.00 | 0.14 | 0.00 | 0.00 | 0.43 |
| Comparative Example 78 | | Sodium sulfite | | 0.00 | 0.10 | 0.08 | 0.03 | 0.00 | 0.00 | 0.00 | 0.00 | 0.28 |
| Comparative Example 79 | | Sodium thiosulfate | | 0.00 | 0.10 | 0.08 | 0.03 | 0.00 | 0.00 | 0.00 | 0.00 | 0.30 |
| Comparative Example 80 | | Propyl gallate | | 0.00 | 0.13 | 0.07 | 0.00 | 0.00 | 0.00 | 0.00 | 0.00 | 0.53 |
| Comparative Example 81 | | 1,3-butanediol | | 0.00 | 0.10 | 0.04 | 0.02 | 0.00 | 0.00 | 0.00 | 0.00 | 0.22 |
| Comparative Example 82 | | (+)-alpha-tocopherol | | 0.03 | 0.11 | 2.07 | 0.03 | 0.00 | 0.20 | 0.00 | 0.00 | 2.56 |
| Comparative Example 83 | | Alpha-tocopherol acetate | | 0.00 | 0.10 | 0.07 | 0.03 | 0.00 | 0.00 | 0.00 | 0.00 | 0.25 |
| Comparative Example 84 | | Benzotriazole | | 0.00 | 0.11 | 0.14 | 0.03 | 0.00 | 0.05 | 0.00 | 0.00 | 0.39 |
| Comparative Example 85 | | Rutin | | 0.01 | 0.11 | 0.07 | 0.00 | 0.00 | 0.01 | 0.00 | 0.00 | 0.27 |
| Comparative Example 86 | | Isoascorbic acid | | 0.00 | 0.08 | 0.00 | 0.00 | 0.00 | 0.00 | 0.00 | 0.00 | 0.12 |
| Comparative Example 87 | Potassium thiocyanate | Ethylenediaminetetraacetic acid (EDTA) | Monothioglycerol | 0.00 | 0.02 | 0.12 | 0.04 | 0.00 | 0.00 | 0.00 | 0.00 | 0.25 |
| Comparative Example 88 | | Cysteine | | 0.00 | 0.00 | 0.11 | 0.02 | 0.00 | 0.00 | 0.00 | 0.00 | 0.15 |
| Comparative Example 89 | | 2-mercaptobenzimidazole | | 0.00 | 0.00 | 0.10 | 0.04 | 0.11 | 0.00 | 0.00 | 0.00 | 0.24 |
| Comparative Example 90 | | Butylhydroxyanisole | | 0.02 | 0.00 | 0.79 | 0.04 | 0.44 | 3.90 | 0.00 | 0.00 | 5.24 |
| Comparative Example 91 | | Dibutylhydroxytoluene | | 0.01 | 0.00 | 0.12 | 0.04 | 0.00 | 0.00 | 0.00 | 0.00 | 0.27 |
| Comparative Example 92 | | Pentaerythrityl tetra-di-t-butyl hydroxyhydrocinnamate | | 0.01 | 0.00 | 0.12 | 0.05 | 0.00 | 0.00 | 0.00 | 0.00 | 0.33 |
| Comparative Example 93 | | Quercetin dihydrate | | 0.27 | 0.00 | 0.04 | 0.00 | 0.00 | 0.00 | 0.00 | 0.00 | 0.40 |
| Comparative Example 94 | | Hydroquinone | | 0.24 | 0.00 | 0.95 | 0.09 | 0.00 | 0.05 | 0.00 | 0.00 | 3.77 |
| Comparative Example 95 | | Sodium hydroxymethane sulfonate | | 0.00 | 0.02 | 0.10 | 0.08 | 0.00 | 0.05 | 0.00 | 0.00 | 0.75 |
| Comparative Example 96 | | Sodium metabisulfite | | 0.00 | 0.00 | 0.12 | 0.08 | 0.00 | 0.00 | 0.00 | 0.00 | 0.27 |
| Comparative Example 97 | | Sodium sulfite | | 0.00 | 0.01 | 0.20 | 0.03 | 0.00 | 0.00 | 0.00 | 0.00 | 0.32 |
| Comparative Example 98 | | Sodium thiosulfate | | 0.00 | 0.00 | 0.14 | 0.05 | 0.00 | 0.00 | 0.00 | 0.00 | 0.25 |
| Comparative Example 99 | | Propyl gallate | | 0.00 | 0.01 | 0.37 | 0.00 | 0.00 | 0.00 | 0.00 | 0.00 | 0.42 |
| Comparative Example 100 | | 1,3-butanediol | | 0.00 | 0.01 | 0.12 | 0.05 | 0.00 | 0.00 | 0.00 | 0.00 | 0.20 |
| Comparative Example 101 | | (+)-alpha-tocopherol | | 0.09 | 0.01 | 6.22 | 0.16 | 0.00 | 0.21 | 0.00 | 0.00 | 6.70 |
| Comparative Example 102 | | Alpha-tocopherol acetate | | 0.00 | 0.01 | 0.12 | 0.04 | 0.00 | 0.00 | 0.00 | 0.00 | 0.22 |

TABLE 9-continued

Short-term stress condition of 70° C., 48 hr, Procedure 2 of impurities analysis

| | | | | Content (%) of each impurity according to RRT | | | | | | | | |
|---|---|---|---|---|---|---|---|---|---|---|---|---|
| Example No. | Stabilizer 1 | Stabilizer 2 | Stabilizer 3 | RRT 0.23[1] | RRT 0.49[2] | RRT 0.57[3] | RRT 0.68[4] | RRT 1.03[5] | RRT 1.08[6] | RRT 1.7[7] | RRT 2.1[8] | TOTAL |
| Comparative Example 103 | | Benzotriazole | | 0.00 | 0.01 | 0.13 | 0.04 | 0.00 | 0.00 | 0.00 | 0.00 | 0.18 |
| Comparative Example 104 | | Rutin | | 0.00 | 0.03 | 0.03 | 0.00 | 0.00 | 0.00 | 0.00 | 0.00 | 0.16 |

[1] RRT 0.23: Desbenzyldonepezil, within 0.15%
[2] RRT 0.49: Donepezil pyridine analog, within 0.15%
[3] RRT 0.57: Unknown impurities, within 0.1%
[4] RRT 0.68: Donepezil quaternary salt, within 0.15%
[5] RRT 1.03: Unknown impurities, within 0.1%
[6] RRT 1.08: Unknown impurities, within 0.1%
[7] RRT 1.7: Donepezil indene analog, within 0.15%
[8] RRT 2.1: Deoxydonepezil, within 0.15%

Of the examples and comparative examples of the present invention, only the Examples of the present invention and Comparative Examples 4 (percutaneous absorption preparation with stabilizer potassium thiocyanate and/or monothioglycerol described in Korean Patent Application No. 2018-0167289 is added), Comparative Example 67 (potassium thiocyanate/rutin), Comparative Example 68 (monothioglycerol/ethylenediaminetetraacetic acid), Comparative Example 70 (monothioglycerol/2-mercaptobenzimidazole), Comparative Example 72 (monothioglycerol/dibutylhydroxytoluene), Comparative Example 74 (monothioglycerol/quercetin dihydrate), Comparative Example 75 (monothioglycerol/hydroquinone), Comparative Example 78 (monothioglycerol/sodium sulfite), Comparative Example 79 (monothioglycerol/sodium thiosulfate), Comparative Example 80 (monothioglycerol/propyl Gallate), Comparative Example 81 (monothioglycerol/1,3-butanediol), Comparative Example 83 (monothioglycerol/alpha-tocopherol acetate), Comparative Example 85 (monothioglycerol/rutin), Comparative Example 86 (monothioglycerol/isoascorbic acid) and Comparative Example 104 (monothioglycerol/potassium thiocyanate/rutin) were met the criteria of both Procedure 1 and Procedure 2 of the impurities analysis method presented in the United States Pharmacopeia under short-term stress conditions of 70° C. for 48 hr.

<Experimental Example 3> Impurities Analysis Under Long-Term Accelerated Conditions (Stored for 1 Month Under 40° C., Relative Humidity 75%

To test the stability of the donepezil percutaneous absorption preparations in long-term storage, Examples 1 through 13 and Comparative Examples 2, 3, 4, 67, 68, 70, 72, 74, 75, 78, 79, 80, 81, 83, 85, 86, and 104 (which met the criteria of Procedure 1 and Procedure 2 of the U.S. Pharmacopoeia) were stored for 1 month under long-term accelerated condition of 40° C. and relative humidity 75%. After 1 month of storage, the preparations were tested with Procedure 1 and Procedure 2 as before. The results are shown in Table 10 and Table 11.

1. Impurities Analysis by Procedure 1:

As seen from Table 10 below, the percutaneous absorption preparation without stabilizer (Comparative Example 1), when analyzed with Procedure 1 under long-term accelerated condition (1 month storage under 40° C. and relative humidity 75%), produced impurities above criteria from donepezil decomposition at the relative retention time 0.53 (unknown impurity), 1.2 (donepezil N-oxide), and total impurities, showing that stabilizers are necessary for the preparation.

Potassium thiocyanate (Comparative Example 2), the stabilizer described in Korean Patent Application No. 2018-0167289, did not meet the criteria of Procedure 1 under long-term accelerated test condition (40° C. relative humidity 75%, 1 month storage). On the other hand, Comparative Example 4 comprising a combination of monothioglycerol (Comparative Example 3) and the above two stabilizers (potassium thiocyanate/monothioglycerol) met the criteria of Procedure 1 under long-term accelerated condition (40° C. relative humidity 75%, stored for 1 month).

Comparative Example 67, which is a percutaneous absorption preparation with combination of potassium thiocyanate, a stabilizer described in Korean Patent Application No. 2018-0167289 and rutin, a stabilizer described in Korean Patent Application Publication No. 10-2009-0086565, met the criteria of Procedure 1 under long-term accelerated test condition (40° C. relative humidity 75%, 1 month storage).

Comparative Example 75 (monothioglycerol/hydroquinone) and Comparative Example 80 (monothioglycerol/propyl gallate), which is a transdermal absorption preparation with stabilizer described in Korean Patent Application No. 2018-0167289 and one of the stabilizers described in Korean Patent Application Publication No. 10-2009-0086565, met the criteria of Procedure 1 presented in the United States Pharmacopoeia under short-term stress condition but failed to meet the criteria of Procedure 1 the conditions for long-term accelerated test (40° C. relative humidity 75%). On the other hand, Comparative Example 68 (monothioglycerol/ethylenediaminetetraacetic acid), Comparative Example 70 (monothioglycerol/2-mercaptobenzimidazole), Comparative Example 72 (monothioglycerol/dibutylhydroxytoluene), Comparative Example 74 (monothioglycerol/quercetin dihydrate), Comparative Example 78 (monothioglycerol/sodium sulfite), Comparative Example 79 (monothioglycerol/sodium thiosulfate), Comparative Example 80 (monothioglycerol/propyl gallate), Comparative Example 81 (monothioglycerol/1,3-butanediol), Comparative Example 83 (monothioglycerol/alpha-tocopherol acetate), Comparative Example 85 (monothioglycerol/rutin) and Comparative Example 86 (monothioglycerol/isoascorbic acid) met the criteria of Procedure 1 presented in the United States Pharmacopoeia under the long-term accelerated test conditions (40° C. relative humidity 75%, 1 month storage).

Also, Comparative Example 104, which is a percutaneous absorption preparation with combination of monothioglycerol, a stabilizer described in Korean Patent Application No. 2018-0167289 and potassium thiocyanate, a stabilizer described in Korean Patent Application Publication No. 10-2009-0086565, met the criteria of Procedure 1 under long-term accelerated test condition (40° C. relative humidity 75%, 1 month storage).

On the other hand, Examples 1 through 13 according to the present invention met the criteria of Procedure 1 presented in the U.S. Pharmacopoeia under long-term accelerated test condition (40° C. relative humidity 75%, stored for 1 month), confirming outstanding stabilizing effect.

TABLE 10

Procedure 1, long-term accelerated test condition (40° C. relative humidity 75%, stored for 1 month)

| | Stabilizer 1 | Stabilizer 2 | Stabilizer 3 | RRT 0.33 [1)] | RRT 0.48 [2)] | RRT 0.53 [3)] | RRT 0.7 [4)] | RRT 1.2 [5)] | Total |
|---|---|---|---|---|---|---|---|---|---|
| Example 1 | Potassium thiocyanate | Tea catechin | — | 0.01 | 0.00 | 0.03 | 0.00 | 0.10 | 0.17 |
| Example 2 | | (+)-catechin | — | 0.00 | 0.00 | 0.03 | 0.00 | 0.10 | 0.16 |
| Example 3 | | Epigallocatechin gallate | — | 0.01 | 0.00 | 0.05 | 0.00 | 0.14 | 0.27 |
| Example 4 | | Ascorbic acid | — | 0.02 | 0.00 | 0.00 | 0.00 | 0.12 | 0.16 |
| Example 5 | | Isoascorbic acid | — | 0.01 | 0.02 | 0.01 | 0.00 | 0.12 | 0.20 |
| Example 6 | | Tea catechin | Monothioglycerol | 0.03 | 0.00 | 0.02 | 0.00 | 0.12 | 0.18 |
| Example 7 | | (+)-catechin | | 0.00 | 0.00 | 0.06 | 0.00 | 0.09 | 0.16 |
| Example 8 | | Epigallocatechin gallate | | 0.01 | 0.00 | 0.03 | 0.00 | 0.14 | 0.19 |
| Example 9 | | Ascorbic acid | | 0.01 | 0.00 | 0.00 | 0.00 | 0.12 | 0.15 |
| Example 10 | | Isoascorbic acid | | 0.00 | 0.00 | 0.00 | 0.00 | 0.16 | 0.20 |
| Example 11 | Monothioglycerol | Tea catechin | — | 0.01 | 0.00 | 0.00 | 0.00 | 0.15 | 0.19 |
| Example 12 | | (+)-catechin | — | 0.00 | 0.00 | 0.04 | 0.00 | 0.20 | 0.25 |
| Example 13 | | Epigallocatechin gallate | — | 0.00 | 0.00 | 0.00 | 0.00 | 0.16 | 0.20 |
| Comparative Example 1 | — | — | — | 0.00 | 0.00 | 0.36 | 0.17 | 1.05 | 1.68 |
| Comparative Example 2 | Potassium thiocyanate | — | — | 0.02 | 0.00 | 0.20 | 0.09 | 0.07 | 0.44 |
| Comparative Example 3 | — | Monothioglycerol | — | 0.07 | 0.00 | 0.11 | 0.00 | 0.18 | 0.41 |
| Comparative Example 4 | Potassium thiocyanate | Monothioglycerol | — | 0.03 | 0.00 | 0.16 | 0.09 | 0.12 | 0.44 |
| Comparative Example 67 | Potassium thiocyanate | Rutin | — | 0.02 | 0.00 | 0.19 | 0.00 | 0.14 | 0.40 |
| Comparative Example 68 | Monothioglycerol | Ethylenediaminetetraacetic acid (EDTA) | — | 0.04 | 0.00 | 0.17 | 0.06 | 0.13 | 0.40 |
| Comparative Example 70 | | 2-mercaptobenzimidazole | — | 0.02 | 0.00 | 0.10 | 0.04 | 0.00 | 0.15 |
| Comparative Example 72 | | Dibutylhydroxytoluene | — | 0.03 | 0.00 | 0.16 | 0.13 | 0.28 | 0.60 |
| Comparative Example 74 | | Quercetin dihydrate | — | 0.00 | 0.05 | 0.05 | 0.18 | 0.15 | 0.43 |
| Comparative Example 75 | | Hydroquinone | — | 0.00 | 0.00 | 0.31 | 0.20 | 0.53 | 1.33 |
| Comparative Example 78 | | Sodium sulfite | — | 0.08 | 0.00 | 0.13 | 0.17 | 0.33 | 0.71 |
| Comparative Example 79 | | Sodium thiosulfate | — | 0.04 | 0.00 | 0.15 | 0.15 | 0.26 | 0.63 |
| Comparative Example 80 | | Propyl gallate | — | 0.00 | 0.03 | 0.33 | 0.00 | 0.24 | 0.60 |
| Comparative Example 81 | | 1,3-butanediol | — | 0.03 | 0.06 | 0.17 | 0.19 | 0.30 | 0.70 |
| Comparative Example 83 | | Alpha-tocopherol acetate | — | 0.06 | 0.00 | 0.016 | 0.14 | 0.36 | 0.71 |
| Comparative Example 85 | | Rutin | — | 0.01 | 0.00 | 0.06 | 0.00 | 0.22 | 0.38 |

TABLE 10-continued

Procedure 1, long-term accelerated test condition (40° C. relative humidity 75%, stored for 1 month)

|  | Stabilizer 1 | Stabilizer 2 | Stabilizer 3 | Content (%) of each impurity according to RRT | | | | | |
|---|---|---|---|---|---|---|---|---|---|
|  |  |  |  | RRT 0.33 [1] | RRT 0.48 [2] | RRT 0.53 [3] | RRT 0.7 [4] | RRT 1.2 [5] | Total |
| Comparative Example 86 |  | Isoascorbic acid | — | 0.02 | 0.00 | 0.03 | 0.00 | 0.25 | 0.34 |
| Comparative Example 104 | Potassium thiocyanate | Rutin | Monothioglycerol | 0.00 | 0.00 | 0.08 | 0.00 | 0.13 | 0.26 |

[1] RRT 0.33: Desbenzyldonepezil, within 0.5%
[2] RRT 0.48: Unknown impurities, within 0.2%
[3] RRT 0.53: Unknown impurities, within 0.2%
[4] RRT 0.7: Donepezil open ring, within 0.5%
[5] RRT 1.2: Donenezil N-oxdie, within 0.5%

2. Impurities Analysis by Procedure 2:

As seen from Table 11 below, the percutaneous absorption preparation without stabilizer (Comparative Example 1), when analyzed with Procedure 2 under long-term accelerated test condition (40° C. relative humidity 75%, stored for 1 month), produced impurities above criteria from donepezil decomposition at the relative retention time 0.49 (Donepezil pyridine analog), 0.57 (unknown related substance), 1.08 (unknown related substance), and total impurities, showing that stabilizers are necessary for the preparation.

Potassium thiocyanate (Comparative Example 2) and monothioglycerol (Comparative Example 3), stabilizers described in Korean Patent Application No. 2018-0167289, did not meet the criteria of Procedure 2 under long-term accelerated test condition (40° C. relative humidity 75%, 1 month storage). On the other hand, Comparative Example 4 comprising a combination of monothioglycerol (Comparative Example 3) and the above two stabilizers (potassium thiocyanate/monothioglycerol) met the criteria of Procedure 2 under long-term accelerated condition (40° C. relative humidity 75%, stored for 1 month).

Comparative Example 67, which is a percutaneous absorption preparation with combination of potassium thiocyanate, a stabilizer described in Korean Patent Application No. 2018-0167289 and rutin, a stabilizer described in Korean Patent Application Publication No. 10-2009-0086565, met the criteria of Procedure 2 under long-term accelerated test condition but failed to meet the criteria of Procedure 2 under long-term accelerated test condition (40° C. relative humidity 75%, 1 month storage).

Comparative Example 68 (monothioglycerol/ethylenediaminetetraacetic acid), Comparative Example 70 (monothioglycerol/2-mercaptobenzimidazol), Comparative Example 72 (monothioglycerol/dibutylhydroxytoluene), Comparative Example 74 (monothioglycerol/quercetin dihydrate), Comparative Example 75 (monothioglycerol/hydroquinone), Comparative Example 78 (monothioglycerol/sodium sulfite), Comparative Example 79 (monothioglycerol/sodium thiosulfite), Comparative Example 80 (monothioglycerol/propyl gallate), Comparative Example 81 (monothioglycerol/1,3-butanediol) and Comparative Examples 83 (monothioglycerol/alpha-tocopherol acetate), which comprise monothioglycerol described in Korean Patent Application No. 2018-0167289 and one of the stabilizers described in Korean Patent Application Publication No. 10-2009-0086565, met the criteria of Procedure 2 presented in the United States Pharmacopoeia under short-term stress condition but failed to meet the criteria of Procedure 2 under long-term accelerated test condition (40° C. relative humidity 75%, 1 month storage). On the other hand, Comparative Example 85 (monothioglycerol/rutin) and Comparative Example 86 (monothioglycerol/isoascorbic acid) met the criteria of Procedure 2 under long-term accelerated test condition (40° C. relative humidity, 75%, 1 month storage).

Also, Comparative Example 104, which is a percutaneous absorption preparation with combination of monothioglycerol, a stabilizer described in Korean Patent Application No. 2018-0167289 and potassium thiocyanate, a stabilizer described in Korean Patent Application Publication No. 10-2009-0086565, met the criteria of Procedure 2 under long-term accelerated test condition (40° C. relative humidity 75%, 1 month storage).

On the other hand, Examples 1 through 13 according to the present invention met the criteria of Procedure 2 presented in the U.S. Pharmacopoeia under long-term accelerated test condition (40° C. relative humidity 75%, stored for 1 month), confirming outstanding stabilizing effect.

TABLE 11

Long-term accelerated test condition (40° C. relative humidity 75%, 1 month storage) Procedure 2

|  | Stabilizer1 | Stabilizer2 | Stabilizer3 | Content (%) of each impurity according to RRT | | | | | | | | |
|---|---|---|---|---|---|---|---|---|---|---|---|---|
|  |  |  |  | RRT 0.23 [1] | RRT 0.49 [2] | RRT 0.57 [3] | RRT 0.68 [4] | RRT 1.03 [5] | RRT 1.08 [6] | RRT 1.7 [7] | RRT 2.1 [8] | TOTAL |
| Example 1 | Potassium thiocyanate | Tea catechin | — | 0.00 | 0.06 | 0.04 | 0.00 | 0.00 | 0.00 | 0.00 | 0.00 | 0.21 |
| Example 2 |  | (+)-catechin | — | 0.09 | 0.05 | 0.06 | 0.00 | 0.00 | 0.00 | 0.00 | 0.00 | 0.31 |
| Example 3 |  | Epigallocatechin gallate | — | 0.00 | 0.07 | 0.05 | 0.02 | 0.00 | 0.00 | 0.00 | 0.00 | 0.26 |
| Example 4 |  | Ascorbic acid | — | 0.00 | 0.06 | 0.00 | 0.00 | 0.00 | 0.00 | 0.00 | 0.00 | 0.12 |

TABLE 11-continued

Long-term accelerated test condition (40° C. relative humidity 75%, 1 month storage) Procedure 2

| | Stabilizer1 | Stabilizer2 | Stabilizer3 | RRT 0.23[1] | RRT 0.49[2] | RRT 0.57[3] | RRT 0.68[4] | RRT 1.03[5] | RRT 1.08[6] | RRT 1.7[7] | RRT 2.1[8] | TOTAL |
|---|---|---|---|---|---|---|---|---|---|---|---|---|
| Example 5 | | Isoascorbic acid | — | 0.00 | 0.07 | 0.00 | 0.00 | 0.00 | 0.00 | 0.00 | 0.00 | 0.15 |
| Example 6 | | tea catechin | Monothioglycerol | 0.00 | 0.06 | 0.02 | 0.00 | 0.00 | 0.00 | 0.00 | 0.00 | 0.20 |
| Example 7 | | (+)-catechin | | 0.00 | 0.05 | 0.06 | 0.00 | 0.00 | 0.00 | 0.00 | 0.00 | 0.21 |
| Example 8 | | Epigallocatechin gallate | | 0.00 | 0.08 | 0.04 | 0.00 | 0.00 | 0.00 | 0.00 | 0.00 | 0.22 |
| Example 9 | | Ascorbic acid | | 0.00 | 0.06 | 0.00 | 0.00 | 0.00 | 0.00 | 0.00 | 0.00 | 0.15 |
| Example 10 | | Isoascorbic acid | | 0.00 | 0.09 | 0.00 | 0.00 | 0.00 | 0.00 | 0.00 | 0.00 | 0.18 |
| Example 11 | Monothioglycerol | tea catechin | — | 0.03 | 0.08 | 0.01 | 0.03 | 0.00 | 0.00 | 0.00 | 0.00 | 0.21 |
| Example 12 | | (+)-catechin | — | 0.00 | 0.10 | 0.05 | 0.00 | 0.00 | 0.00 | 0.00 | 0.00 | 0.25 |
| Example 13 | | Epigallocatechin gallate | — | 0.00 | 0.10 | 0.02 | 0.00 | 0.00 | 0.00 | 0.00 | 0.00 | 0.22 |
| Comparative Example 1 | — | — | — | 0.05 | 0.52 | 0.63 | 0.05 | 0.00 | 0.05 | 0.00 | 0.00 | 1.45 |
| Comparative Example 2 | Potassium thiocyanate | — | — | 0.02 | 0.01 | 0.33 | 0.00 | 0.00 | 0.00 | 0.00 | 0.00 | 0.49 |
| Comparative Example 3 | — | Monothioglycerol | — | 0.00 | 0.09 | 0.14 | 0.00 | 0.00 | 0.00 | 0.00 | 0.00 | 0.46 |
| Comparative Example 4 | Potassium thiocyanate | Monothioglycerol | — | 0.03 | 0.06 | 0.09 | 0.00 | 0.00 | 0.00 | 0.00 | 0.00 | 0.41 |
| Comparative Example 67 | Potassium thiocyanate | Rutin | — | 0.00 | 0.08 | 0.28 | 0.03 | 0.00 | 0.00 | 0.00 | 0.00 | 0.48 |
| Comparative Example 68 | Monothioglycerol | Ethylenediaminetetraacetic acid (EDTA) | — | 0.02 | 0.05 | 0.29 | 0.00 | 0.00 | 0.04 | 0.00 | 0.00 | 0.40 |
| Comparative Example 70 | | 2-mercaptobenzoimidazol | — | 0.00 | 0.00 | 0.15 | 0.05 | 0.00 | 0.00 | 0.00 | 0.00 | 0.20 |
| Comparative Example 72 | | dibutylhydroxytoluene | — | 0.04 | 0.04 | 0.28 | 0.00 | 0.00 | 0.18 | 0.00 | 0.00 | 0.54 |
| Comparative Example 74 | | Quercetin dihydrate | — | 0.00 | 0.18 | 0.11 | 0.00 | 0.00 | 0.00 | 0.00 | 0.00 | 0.29 |
| Comparative Example 75 | | Hydroquinone | — | 0.04 | 0.13 | 0.47 | 0.44 | 0.00 | 0.16 | 0.00 | 0.00 | 1.47 |
| Comparative Example 78 | | Sodium sulfite | — | 0.05 | 0.05 | 0.27 | 0.00 | 0.00 | 0.14 | 0.00 | 0.00 | 0.51 |
| Comparative Example 79 | | Sodium thiosulfate | — | 0.05 | 0.05 | 0.26 | 0.00 | 0.00 | 0.13 | 0.00 | 0.00 | 0.49 |
| Comparative Example 80 | | Propyl gallate | — | 0.03 | 0.07 | 0.50 | 0.00 | 0.00 | 0.00 | 0.00 | 0.00 | 0.76 |
| Comparative Example 81 | | 1,3-Butanediol | — | 0.07 | 0.11 | 0.27 | 0.00 | 0.00 | 0.18 | 0.00 | 0.00 | 0.62 |
| Comparative Example 83 | | alpha-tocopherol acetate | — | 0.05 | 0.09 | 0.26 | 0.00 | 0.00 | 0.15 | 0.00 | 0.00 | 0.55 |
| Comparative Example 85 | | Rutin | — | 0.00 | 0.12 | 0.08 | 0.00 | 0.00 | 0.00 | 0.00 | 0.00 | 0.29 |
| Comparative Example 86 | | Isoascorbic acid | — | 0.00 | 0.14 | 0.02 | 0.00 | 0.00 | 0.00 | 0.00 | 0.00 | 0.26 |
| Comparative Example 104 | Potassium thiocyanate | Rutin | — | 0.00 | 0.08 | 0.09 | 0.00 | 0.00 | 0.01 | 0.00 | 0.00 | 0.24 |

[1] RRT 0.23: Desbenzyldonepezil, within 0.15%
[2] RRT 0.49: Donepezil pyridine analog, within 0.15%
[3] RRT 0.57: Unknown impurities, within 0.1%
[4] RRT 0.68: Donepezil quaternary salt, within 0.15%
[5] RRT 1.03: Unknown impurities, within 0.1%
[6] RRT 1.08: Unknown impurities, within 0.1%
[7] RRT 1.7: Donepezil indene analog, within 0.15%
[8] RRT 2.1: Deoxydonepezil, within 0.15%

<Experimental Example 4> Impurities Analysis Under Long-Term Accelerated Conditions (Stored for 3 Month Under 40° c., Relative Humidity 75%

To test the stability of the donepezil percutaneous absorption preparations in long-term storage, Examples 1 through 13 and Comparative Examples 4, 85, 86, and 104, which met the criteria of Procedure 1 and Procedure 2 of the U.S. Pharmacopoeia under long-term accelerated test condition (40° C. relative humidity 75%, 1 month storage) in Experimental Example 3, were stored for 3 months under long-term accelerated condition of 40° C. and relative humidity 75%. Afterwards, the preparations were tested with Procedure 1 and Procedure 2 in the same way as Experimental Experiment 1 above. The results are shown in Table 12 and Table 13.

1. Impurities Analysis by Procedure 1:

As seen from Table 12 below, the percutaneous absorption preparation without stabilizer (Comparative Example 1), when analyzed with Procedure 1 under long-term accelerated condition (3 month storage under 40° C. and relative humidity 75%), produced impurities above criteria from donepezil decomposition at the relative retention time 0.53 (unknown impurity), 1.2 (donepezil N-oxide), and total impurities, showing that stabilizers are necessary for the preparation.

Percutaneous absorption preparation (Comparative Example 4) comprising both potassium thiocyanate and monothioglycerol, which are the stabilizers described in Korean Patent Application No. 2018-0167289 did not meet the criteria of Procedure 1 of the U.S. Pharmacopoeia under long-term accelerated test conditions (40° C. relative humidity 75%, storage for 3 months).

Of the percutaneous absorption preparations comprising monothioglycerol, a stabilizer described in Korean Patent Application No. 2018-0167289, and one of the stabilizers described in Korean Patent Application Publication No. 10-2009-0086565, Comparative Example 86 (monothioglycerol/isoascorbic acid) met the criteria of Procedure 1 of the U.S. Pharmacopoeia under long-term accelerated test condition (40° C. relative humidity 75%, 3 month storage), whereas Comparative Example 85 (monothioglycerol/rutin) did not meet the criteria.

Also, Comparative Example 104, which is a percutaneous absorption preparation with a combination of monothioglycerol and potassium thiocyanate, which are described in Korean Patent Application 2018-0167289, and rutin, which is described in Korean Patent Application Publication No. 10-2009-0086565, also failed to meet the criteria of Procedure 1 presented in the United States Pharmacopeia.

On the other hand, Examples 1 through 13 according to the present invention met the criteria of Procedure 1 presented in the U.S. Pharmacopoeia under long-term accelerated test condition (40° C. relative humidity 75%, stored for 3 month), confirming outstanding stabilizing effect.

TABLE 12

Long-term accelerated test condition (40° C. relative humidity 75%, 3 month storage) Procedure 1

| | Stabilizer 1 | Stabilizer 2 | Stabilizer 3 | RRT 0.33[1] | RRT 0.48[2] | RRT 0.53[3] | RRT 0.7[4] | RRT 1.2[5] | Total |
|---|---|---|---|---|---|---|---|---|---|
| Example 1 | Potassium thiocyanate | tea catechin | — | 0.00 | 0.00 | 0.12 | 0.02 | 0.12 | 0.31 |
| Example 2 | | (+)-catechin | — | 0.00 | 0.00 | 0.13 | 0.04 | 0.08 | 0.30 |
| Example 3 | | Epigallocatechin gallate | — | 0.00 | 0.02 | 0.13 | 0.05 | 0.12 | 0.36 |
| Example 4 | | Ascorbic acid | — | 0.00 | 0.00 | 0.17 | 0.06 | 0.24 | 0.57 |
| Example 5 | | Isoascorbic acid | — | 0.01 | 0.00 | 0.14 | 0.05 | 0.25 | 0.51 |
| Example 6 | | tea catechin | | 0.02 | 0.01 | 0.11 | 0.06 | 0.13 | 0.41 |
| Example 7 | | (+)-catechin | | 0.00 | 0.00 | 0.16 | 0.00 | 0.03 | 0.32 |
| Example 8 | | Epigallocatechin gallate | Monothioglycerol | 0.00 | 0.00 | 0.12 | 0.02 | 0.12 | 0.29 |
| Example 9 | | Ascorbic acid | | 0.00 | 0.03 | 0.15 | 0.06 | 0.23 | 0.54 |
| Example 10 | | Isoascorbic acid | | 0.00 | 0.00 | 0.14 | 0.09 | 0.19 | 0.48 |
| Example 11 | Monothioglycerol | tea catechin | — | 0.01 | 0.02 | 0.05 | 0.04 | 0.24 | 0.39 |
| Example 12 | | (+)-catechin | — | 0.00 | 0.00 | 0.16 | 0.09 | 0.39 | 0.76 |
| Example 13 | | Epigallocatechin gallate | — | 0.03 | 0.00 | 0.13 | 0.06 | 0.32 | 0.57 |
| Comparative Example 1 | — | — | — | 0.00 | 0.00 | 0.71 | 0.29 | 1.84 | 3.04 |
| Comparative Example 4 | Potassium thiocyanate | Monothioglycerol | — | 0.00 | 0.03 | 0.37 | 0.24 | 0.15 | 0.92 |
| Comparative Example 85 | Monothioglycerol | Rutin | — | 0.00 | 0.00 | 0.27 | 0.12 | 0.41 | 0.94 |
| Comparative Example 86 | Monothioglycerol | Isoascorbic acid | — | 0.02 | 0.00 | 0.09 | 0.08 | 0.35 | 0.61 |
| Comparative Example 104 | Potassium thiocyanate | Rutin | Monothioglycerol | 0.00 | 0.00 | 0.23 | 0.05 | 0.19 | 0.53 |

[1] RRT 0.33: Desbenzyldonepezil, within 0.5%
[2] RRT 0.48: Unknown impurities, within 0.2%
[3] RRT 0.53: Unknown impurities, within 0.2%
[4] RRT 0.7: Donepezil open ring, within 0.5%
[5] RRT 1.2: Donepezil N-oxides, within 0.5%

2. Impurities Analysis by Procedure 2:

As seen from Table 13 below, the percutaneous absorption preparation without stabilizer (Comparative Example 1), when analyzed with Procedure 2 under long-term accelerated test condition (40° C. relative humidity 75%, stored for 3 months), produced impurities above criteria from donepezil decomposition at the relative retention time 0.49 (Donepezil pyridine analog), 0.57 (unknown related substance), 1.08 (unknown related substance), and total impurities, showing that stabilizers are necessary for the preparation.

Percutaneous absorption preparation (Comparative Example 4) comprising both potassium thiocyanate and monothioglycerol, which are the stabilizers described in Korean Patent Application No. 2018-0167289, did not meet the criteria of Procedure 2 of the U.S. Pharmacopoeia under the condition of 40° C. relative humidity 75%, storage for 3 months due to production of impurities over the criteria.

Also, Comparative Example 104, which is a percutaneous absorption preparation with a combination of monothioglycerol and potassium thiocyanate, which are described in Korean Patent Application 2018-0167289, and rutin, which is described in Korean Patent Application Publication No. 10-2009-0086565, also failed to meet the criteria of Procedure 2 presented in the United States Pharmacopeia under long-term accelerated test condition (40° C., relative humidity 75%, 3 month storage).

On the other hand, Examples 1 through 13 according to the present invention met the criteria of Procedure 2 presented in the U.S. Pharmacopoeia under long-term accelerated test condition (40° C. relative humidity 75%, stored for 3 month), confirming outstanding stabilizing effect.

TABLE 13

Long-term accelerated test condition (40° C. relative humidity 75%, 3 month storage) Procedure 2

| | Stabilizer1 | Stabilizer2 | Stabilizer3 | RRT 0.23[1] | RRT 0.49[2] | RRT 0.57[3] | RRT 0.68[4] | RRT 1.03[5] | RRT 1.08[6] | RRT 1.7[7] | RRT 2.1[8] | Total |
|---|---|---|---|---|---|---|---|---|---|---|---|---|
| Example1 | Potassium thiocyanate | tea catechin | — | 0.06 | 0.06 | 0.08 | 0.00 | 0.00 | 0.00 | 0.00 | 0.00 | 0.25 |
| Example2 | | (+)-catechin | — | 0.02 | 0.12 | 0.09 | 0.00 | 0.00 | 0.00 | 0.00 | 0.00 | 0.26 |
| Example3 | | Epigallocatechin gallate | — | 0.02 | 0.08 | 0.09 | 0.00 | 0.00 | 0.00 | 0.00 | 0.00 | 0.30 |
| Example4 | | Ascorbic acid | — | 0.01 | 0.07 | 0.00 | 0.00 | 0.00 | 0.00 | 0.00 | 0.00 | 0.16 |
| Example5 | | Isoascorbic acid | — | 0.01 | 0.05 | 0.02 | 0.00 | 0.00 | 0.00 | 0.00 | 0.00 | 0.15 |
| Example6 | | tea catechin | Monothioglycerol | 0.03 | 0.11 | 0.06 | 0.00 | 0.00 | 0.00 | 0.00 | 0.00 | 0.23 |
| Example7 | | (+)-catechin | | 0.04 | 0.04 | 0.08 | 0.00 | 0.00 | 0.00 | 0.00 | 0.00 | 0.39 |
| Example8 | | Epigallocatechin gallate | | 0.02 | 0.07 | 0.08 | 0.00 | 0.00 | 0.00 | 0.00 | 0.00 | 0.27 |
| Example9 | | Ascorbic acid | | 0.00 | 0.07 | 0.03 | 0.00 | 0.00 | 0.00 | 0.00 | 0.00 | 0.19 |
| Example10 | | Isoascorbic acid | | 0.00 | 0.07 | 0.06 | 0.00 | 0.00 | 0.00 | 0.00 | 0.00 | 0.20 |
| Example11 | Monothioglycerol | tea catechin | — | 0.10 | 0.09 | 0.05 | 0.00 | 0.00 | 0.01 | 0.00 | 0.00 | 0.25 |
| Example12 | | (+)-catechin | — | 0.05 | 0.07 | 0.07 | 0.00 | 0.00 | 0.00 | 0.00 | 0.00 | 0.24 |
| Example13 | | Epigallocatechin gallate | — | 0.05 | 0.04 | 0.08 | 0.00 | 0.00 | 0.00 | 0.00 | 0.00 | 0.27 |
| Comparative Example 1 | — | — | — | 0.10 | 0.91 | 0.92 | 0.01 | 0.00 | 0.06 | 0.00 | 0.00 | 2.38 |
| Comparative Example 4 | Potassium thiocyanate | Monothioglycerol | — | 0.07 | 0.04 | 0.43 | 0.00 | 0.00 | 0.04 | 0.00 | 0.00 | 0.71 |
| Comparative Example 85 | Monothioglycerol | Rutin | — | 0.01 | 0.15 | 0.17 | 0.00 | 0.00 | 0.00 | 0.00 | 0.00 | 0.37 |
| Comparative Example 86 | Monothioglycerol | Isoascorbic acid | — | 0.01 | 0.16 | 0.11 | 0.00 | 0.00 | 0.00 | 0.00 | 0.00 | 0.33 |
| Comparative Example 104 | Potassium thiocyanate | Rutin | — | 0.01 | 0.09 | 0.37 | 0.00 | 0.00 | 0.00 | 0.00 | 0.00 | 0.57 |

[1] RRT 0.23: Desbenzyldonepezil, within 0.15%
[2] RRT 0.49: Donepezil pyridine analog, within 0.15%
[3] RRT 0.57: Unknown impurities, within 0.1%
[4] RRT 0.68: Donepezil quaternary salt, within 0.15%
[5] RRT 1.03: Unknown impurities, within 0.1%
[6] RRT 1.08: Unknown impurities, within 0.1%
[7] RRT 1.7: Donepezil indene analog, within 0.15%
[8] RRT 2.1: Deoxydonepezil, within 0.15%

The above experiment results show that the storage stability of donepezil cannot be confirmed using only Procedure 1 or only Procedure 2 of the donepezil impurity analysis.

Donepezil is a dementia treatment that is taken over a long period of time by increasing the dose in a stepwise manner. If a preparation comprising impurities is administered continuously, there is a possibility of a potential risk from toxicity of the unknown impurities. For the long-term storage stability of donepezil percutaneous absorption preparation, the tolerance criteria for impurities should be set and managed.

As for the impurities related to donepezil that are published in the United States Pharmacopoeia, Procedure 1 can identify 3 types of impurities, and Procedure 2 can identify 5 types of impurities. Other than desbenzyl donepezil, which can be identified by either procedure, no other impurities overlap between the two procedures. There are criteria of acceptable limits of these impurities in the preparation in consideration of toxicity.

The present invention provides a percutaneous absorption preparation comprising donepezil that meets Procedure 1 and Procedure 2 criteria by comprising potassium thiocyanate or monothioglycerol, the stabilizers disclosed in Korean Patent Application No. 2018-0167289. The change in impurities over time was confirmed by short-term stress test (stored at 70° C. for 48 hours), long-term accelerated test 1 (stored at 40° C. relative humidity 75% for 1 month) and long-term accelerated test 2 (stored at 40° C. relative humidity 75% for 3 months).

Under short-term stress conditions of 70° C. or 48 hours, all Examples of the present invention, Comparative Examples 2 through 4 (potassium thiocyanate and/or monothioglycerol), Comparative Example 67 (potassium thiocyanate/rutin), and Comparative Example 104 (monothioglycerol/potassium thiocyanate/rutin) met the criteria of both Procedure 1 and Procedure 2 of impurities analysis methods presented in the United States Pharmacopeia.

The first type and second type stabilizers disclosed in the examples of Korean Patent Application Publication No. 10-2009-0086565 did not meet the criteria of Procedure 1 and/or Procedure 2 of the United States Pharmacopoeia under short-term stress condition of 70° C. for 48 hours. But among percutaneous preparations comprising 3-mercapto-1,2-propanediol (also known as monothioglycerol) and other stabilizers, which are Comparative Example 68 (monothioglycerol/ethylenediaminetetraacetic acid), Comparative Example 70 (monothioglycerol/2-mercaptobenzimidazole), Comparative Example 72 (monothioglycerol/dibutylhydride), Comparative Example 74 (monothioglycerol/quercetin dihydrate), Comparative Example 75 (monothioglycerol/hydroquinone), Comparative Example 78 (monothioglycerol/sodium sulfite), Comparative Example 79 (monothioglycerol/sodium thiosulfate), Comparative Example 80 (monothioglycerol/propyl gallate), Comparative Example 81 (monothioglycerol/1,3-butanediol), Comparative Example 83 (monothioglycerol/alpha-tocopherol acetate), Comparative Example 85 (monothioglycerol/rutin), a percutaneous absorption preparation prepared in Comparative Example 86 (monothioglycerol/isoascorbic acid) all met the criteria of both Procedure 1 and Procedure 2 presented in the United States Pharmacopoeia under short-term stress condition of 70° C. for 48 hours.

In Experimental Example 3 described in the present invention, to test the stability of the donepezil percutaneous absorption preparations in long-term storage, Examples of the present invention and Comparative Examples 2, 3, 4, 67, 68, 70, 72, 74, 75, 78, 79, 80, 81, 83, 85, 86, and 104 (which met the criteria of Procedure 1 and Procedure 2 of the U.S. Pharmacopoeia under short-term stress test of Experimental Examples 1 and 2) were stored for 1 month under long-term accelerated condition of 40° C. and relative humidity 75%. Afterwards, the preparations were tested for impurities.

In Experimental Example 3 described in the present invention, only Comparative Example 4, a percutaneous absorption preparation comprising both potassium thiocyanate and monothioglycerol (described in Korean Patent Application No. 2018-0167289), met the criteria set forth in the United States Pharmacopeia. Comparative Example 2 (potassium thiocyanate) and Comparative Example 3 (monothioglycerol) did not meet the criteria under long-term accelerated test under condition of 1 month storage in relative humidity 75%. Also, Comparative Example 104, which is a percutaneous absorption preparation with a combination of monothioglycerol and potassium thiocyanate, which are described in Korean Patent Application 2018-0167289, and rutin, which is described in Korean Patent Application Publication No. 10-2009-0086565, met the criteria of Procedure 1 and Procedure 2 presented in the United States Pharmacopeia under long-term accelerated condition (40° C. relative humidity 75%, 1 month storage).

However, among percutaneous absorption preparations comprising a combination of monothioglycerol described in Korean Patent Application No. 2018-0167289 (which is the same as 3-mercapto-1,2-propanediol described in Korean Patent Application Publication No. 10-2009-0086565) and a stabilizer described in Korean Patent Application Publication No. 10-2009-0086565, Comparative Example 85 (monothioglycerol/rutin), and Comparative Example 86 (monothioglycerol/isoascorbic acid) met the criteria of Procedure 1 and Procedure 2 under long-term accelerated test condition (40° C. relative humidity 75%, stored for 1 month), whereas Comparative Examples 68, 70, 72, 74, 75, 78, 79, 80, 81 and 83 did not meet the criteria of Procedure 1 and Procedure 2 under long-term accelerated test condition (40° C., relative humidity 75%, 1 month storage).

In Experimental Example 4, the Examples of the present invention and Comparative Examples 4, 85, 86, and 104, which had met the criteria for impurities presented in the U.S. Pharmacopoeia under 1 month long-term accelerated condition at 40° C. and relative humidity 75%, were subject to accelerated test of 3 month storage at 40° C. and relative humidity 75% and analyzed for impurities by the methods presented in the U.S. Pharmacopoeia to see the change in impurities over time.

In Experimental Example 4, Comparative Example 4 (potassium thiocyanate/monothioglycerol), which is a percutaneous absorption preparation comprising both potassium thiocyanate and monothioglycerol described in Korean Patent Application No. 2018-0167289, and Comparative Example 104 (potassium thiocyanate/monothioglycerol/rutin), which is a percutaneous absorption preparation comprising mono glycerol and potassium thiocyanate described in Korean Patent Application No. 2018-0167289 and rutin described in Korean Patent Publication No. 10-2009-0086565, increased in impurities production after 1 month at 40° C. and relative humidity 75%, failing to meet the criteria of Procedure 1 and Procedure 2 presented in the U.S. Pharmacopoeia for 3 month storage.

However, among percutaneous absorption preparations made to comprise a combination of monothioglycerol, a stabilizer described in Korean Patent Application No. 2018-0167289 (which is the same as 3-mercapto-1,2-propanediol described in Korean Patent Application Publication No.

10-2009-0086565) and a stabilizer described in Korean Patent Publication No. 10-2009-0086565. Comparative Example 85 (monothioglycerol/rutin) did not meet the criteria for impurities of Procedure 1 and Procedure 2 presented in the U.S. Pharmacopoeia. Comparative Example 86 (monothioglycerol/isoascorbic acid) met the criteria of Procedure 1 but failed to meet the criteria of Procedure 2.

Therefore, the present invention provides a percutaneous absorption preparation comprising donepezil that meet the criteria of Procedure 1 and Procedure 2 presented in the U.S. Pharmacopoeia in short-term stress test (70° C. 48 hours storage), long-term accelerated test 1 (40° C. relative humidity 75% 1 month storage), and long-term accelerated test 2 (40° C. relative humidity 75% 3 months storage). The donepezil-containing percutaneous absorption preparation reduces the production of impurities by inhibiting decomposition of donepezil, thereby making it possible to make a percutaneous absorption preparation comprising donepezil with improved stability for long-term preservation.

The invention claimed is:

1. A donepezil percutaneous absorption preparation for the treatment of dementia comprising a support layer, a drug-containing layer, and a release layer,
wherein the drug-containing layer comprises donepezil or a pharmaceutically acceptable salt thereof as an active ingredient; a pressure-sensitive adhesive; and a stabilizer combination which is either (i) a mixture of a thiocyanate salt and a stabilizer selected from the group consisting of tea catechins, (+)-catechin, epigallocatechin gallate, ascorbic acid, and isoascorbic acid, or (ii) a mixture of monothioglycerol and a stabilizer selected from the group consisting of tea catechins, (+)-catechin and epigallocatechin gallate.

2. The percutaneous absorption preparation according to claim 1, wherein the donepezil is in the form of a free base.

3. The percutaneous absorption preparation according to claim 1, wherein the stabilizer combination is a mixture of a thiocyanate salt and a stabilizer selected from the group consisting of tea catechins, (+)-catechin, epigallocatechin gallate, ascorbic acid and isoascorbic acid.

4. The preparation of claim 3, wherein the stabilizer combination also comprises monothioglycerol.

5. The preparation of claim 3, wherein the thiocyanate salt is potassium thiocyanate.

6. The preparation of claim 1, wherein the thiocyanate salt is potassium thiocyanate.

7. The percutaneous absorption preparation according to claim 1, wherein the stabilizer combination is a mixture of monothioglycerol and a stabilizer selected from the group consisting of tea catechins, (+)-catechin and epigallocatechin gallate.

8. A method of preparing donepezil percutaneous absorption preparation comprising a support layer, a drug-containing layer, and a release layer, wherein the method comprises the following steps:
i) dissolving various ingredients including donepezil or a pharmaceutically acceptable salt thereof, a pressure-sensitive adhesive, and a stabilizer combination which is either a mixture of thiocyanate salt and a stabilizer selected from the group consisting of tea catechins, (+)-catechin, epigallocatechin gallate, ascorbic acid, and isoascorbic acid, or a mixture of monothioglycerol and a stabilizer selected from the group consisting of tea catechins, (+)-catechin and epigallocatechin gallate in an organic solvent to produce a solution;
ii) applying the solution prepared in the above step to the release layer and drying it to form the drug-containing layer; and
iii) laminating the drug-containing layer with the support layer.

9. The method of claim 8, wherein the organic solvent is selected from the group consisting of ethyl acetate, toluene, hexane, 2-propanol, methanol, ethanol, methylene chloride, and tetrahydrofuran.

10. The method of claim 8, wherein the donepezil is in the form of a free base.

11. The method of claim 8, wherein the stabilizer combination is a mixture of a thiocyanate salt and a stabilizer selected from the group consisting of tea catechins, (+)-catechin, epigallocatechin gallate, ascorbic acid and isoascorbic acid.

12. The method of claim 11, wherein the stabilizer combination further comprises monothioglycerol.

13. The method of claim 11, wherein the thiocyanate salt is potassium thiocyanate.

14. The method of claim 8, wherein the thiocyanate salt is potassium thiocyanate.

15. The method of claim 8, wherein the stabilizer combination is a mixture of monothioglycerol and a stabilizer selected from the group consisting of tea catechins, (+)-catechin and epigallocatechin gallate.

* * * * *